(12) United States Patent
Thelen et al.

(10) Patent No.: US 8,175,459 B2
(45) Date of Patent: May 8, 2012

(54) HYBRID WIRELESS/WIRED ROF TRANSPONDER AND HYBRID ROF COMMUNICATION SYSTEM USING SAME

(75) Inventors: Dean Michael Thelen, Addison, NY (US); Jacob George, Horseheads, NY (US); Luis Alberto Zenteno, Painted Post, NY (US); Michael Sauer, Corning, NY (US); Martyn N. Easton, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 960 days.

(21) Appl. No.: 11/974,226

(22) Filed: Oct. 12, 2007

(65) Prior Publication Data
US 2009/0097855 A1 Apr. 16, 2009

(51) Int. Cl.
*H04B 10/00* (2006.01)

(52) U.S. Cl. ............ 398/115; 398/116; 398/66; 398/67; 398/68; 398/72; 398/76; 398/74; 398/100; 370/352; 370/389; 370/392; 370/503; 370/474; 455/561; 455/562; 725/105; 725/106; 725/125; 725/127; 725/129

(58) Field of Classification Search .................. 398/115, 398/116, 128, 130, 135, 66, 67, 68, 70, 71, 398/72, 74, 75, 76, 79, 98, 99, 100; 370/352, 370/392, 389, 465, 474, 466, 503, 328; 455/561, 455/562, 3.1, 5.1, 6.1, 6.3; 725/105, 106, 725/125, 127, 129
See application file for complete search history.

(56) References Cited

U.S. PATENT DOCUMENTS 4,365,865 A 12/1982 Stiles
4,867,527 A 9/1989 Dotti et al.
4,889,977 A 12/1989 Haydon
(Continued)

FOREIGN PATENT DOCUMENTS
AU 645192 B 10/1992
(Continued)

OTHER PUBLICATIONS

Schubert, et al., "Wireless Access to ATM-Networks Based on Optical Microwave Generation," Vehicular Technology Conference, 1997, IEEE, vol. 1, May 4, 1997, pp. 275-279.
(Continued)

*Primary Examiner* — Hanh Phan
(74) *Attorney, Agent, or Firm* — Christopher Keith Montgomery

(57) ABSTRACT

A radio-over-fiber (RoF) hybrid wired/wireless transponder is disclosed that is configured to provide both wireless and wired communication between a hybrid head-end and one or more client devices. The hybrid transponder includes optical-to-electrical (O/E) and electrical-to-optical (E/O) conversion capability and is configured to frequency multiplex/demultiplex electrical "wired" signals and electrical "wireless" signals. The electrical wireless signals are wirelessly communicated to the client device(s) via a multiple-input/multiple-output (MIMO) antenna system within a cellular coverage area. The electrical wired signals are communicated to the client device(s) via a wireline cable that plugs into a wireline cable port on the transponder. The hybrid RoF system includes a hybrid head-end capable of transmitting and receiving wired and wireless optical signals, and an optical fiber cable that is optically coupled to the hybrid head-end and to at least one hybrid transponder. Drop-down transponder configurations that allow for easy wired and wireless connectivity between the client device(s) to the transponder(s) are also disclosed.

20 Claims, 10 Drawing Sheets

U.S. PATENT DOCUMENTS

| | | | |
|---|---|---|---|
| 4,896,939 A | 1/1990 | O'Brien | |
| 4,916,460 A | 4/1990 | Powell | |
| 5,039,195 A | 8/1991 | Jenkins et al. | |
| 5,042,086 A | 8/1991 | Cole et al. | |
| 5,125,060 A | 6/1992 | Edmundson | |
| 5,189,718 A | 2/1993 | Barrett et al. | |
| 5,189,719 A | 2/1993 | Coleman et al. | |
| 5,210,812 A | 5/1993 | Nilsson et al. | |
| 5,260,957 A | 11/1993 | Hakimi et al. | |
| 5,268,971 A | 12/1993 | Nilsson et al. | |
| 5,301,056 A | 4/1994 | O'Neill | |
| 5,339,058 A | 8/1994 | Lique | |
| 5,339,184 A | 8/1994 | Tang | |
| 5,377,035 A | 12/1994 | Wang et al. | |
| 5,379,455 A | 1/1995 | Koschek | |
| 5,400,391 A | 3/1995 | Emura et al. | |
| 5,424,864 A | 6/1995 | Emura | |
| 5,444,564 A | 8/1995 | Newberg | |
| 5,457,557 A | 10/1995 | Zarem et al. | |
| 5,459,727 A | 10/1995 | Vannucci | |
| 5,469,523 A | 11/1995 | Blew et al. | |
| 5,539,393 A | 7/1996 | Barfod | |
| 5,543,000 A | 8/1996 | Lique | |
| 5,546,443 A | 8/1996 | Raith | |
| 5,557,698 A | 9/1996 | Gareis et al. | |
| 5,574,815 A | 11/1996 | Kneeland | |
| 5,598,288 A | 1/1997 | Collar | |
| 5,615,034 A | 3/1997 | Hori | |
| 5,627,879 A | 5/1997 | Russell et al. | |
| 5,640,678 A | 6/1997 | Ishikawa et al. | |
| 5,642,405 A | 6/1997 | Fischer et al. | |
| 5,644,622 A | 7/1997 | Russell et al. | |
| 5,648,961 A | 7/1997 | Ebihara | |
| 5,651,081 A | 7/1997 | Blew et al. | |
| 5,668,562 A | 9/1997 | Cutrer et al. | |
| 5,677,974 A | 10/1997 | Elms et al. | |
| 5,682,256 A | 10/1997 | Motley et al. | |
| 5,703,602 A | 12/1997 | Casebolt | |
| 5,790,606 A | 8/1998 | Dent | |
| 5,802,473 A | 9/1998 | Rutledge et al. | |
| 5,805,983 A | 9/1998 | Naidu et al. | |
| 5,812,296 A | 9/1998 | Tarusawa et al. | |
| 5,818,619 A | 10/1998 | Medved et al. | |
| 5,821,510 A | 10/1998 | Cohen et al. | |
| 5,825,651 A | 10/1998 | Gupta et al. | |
| 5,838,474 A | 11/1998 | Stilling | |
| 5,852,651 A | 12/1998 | Fischer et al. | |
| 5,854,986 A | 12/1998 | Dorren et al. | |
| 5,867,485 A | 2/1999 | Chambers et al. | |
| 5,867,763 A * | 2/1999 | Dean et al. | 725/114 |
| 5,880,867 A | 3/1999 | Ronald | |
| 5,881,200 A | 3/1999 | Burt | |
| 5,883,882 A | 3/1999 | Schwartz | |
| 5,896,568 A | 4/1999 | Tseng et al. | |
| 5,903,834 A | 5/1999 | Wallstedt et al. | |
| 5,910,776 A | 6/1999 | Black | |
| 5,913,003 A | 6/1999 | Arroyo et al. | |
| 5,917,636 A | 6/1999 | Wake et al. | |
| 5,930,682 A | 7/1999 | Schwartz et al. | |
| 5,936,754 A | 8/1999 | Ariyavisitakul et al. | |
| 5,943,372 A | 8/1999 | Gans et al. | |
| 5,946,622 A | 8/1999 | Bojeryd | |
| 5,949,564 A | 9/1999 | Wake | |
| 5,959,531 A | 9/1999 | Gallagher, III et al. | |
| 5,960,344 A | 9/1999 | Mahany | |
| 5,969,837 A | 10/1999 | Farber et al. | |
| 5,983,070 A | 11/1999 | Georges et al. | |
| 5,987,303 A | 11/1999 | Dutta et al. | |
| 6,005,884 A | 12/1999 | Cook et al. | |
| 6,006,105 A | 12/1999 | Rostoker et al. | |
| 6,014,546 A | 1/2000 | Georges et al. | |
| 6,016,426 A | 1/2000 | Bodell | |
| 6,023,625 A | 2/2000 | Myers, Jr. | |
| 6,049,312 A | 4/2000 | Lord et al. | |
| 6,088,381 A | 7/2000 | Myers, Jr. | |
| 6,127,917 A | 10/2000 | Tuttle | |
| 6,128,470 A | 10/2000 | Naidu et al. | |
| 6,148,041 A | 11/2000 | Dent | |
| 6,150,921 A | 11/2000 | Werb et al. | |
| 6,157,810 A | 12/2000 | Georges et al. | |
| 6,232,870 B1 | 5/2001 | Garber et al. | |
| 6,236,789 B1 | 5/2001 | Fitz | |
| 6,240,274 B1 | 5/2001 | Izadpanah | |
| 6,268,946 B1 | 7/2001 | Larkin et al. | |
| 6,292,673 B1 | 9/2001 | Maeda et al. | |
| 6,314,163 B1 | 11/2001 | Acampora | |
| 6,323,980 B1 | 11/2001 | Bloom | |
| 6,324,391 B1 | 11/2001 | Bodell | |
| 6,337,754 B1 | 1/2002 | Imajo | |
| 6,353,406 B1 | 3/2002 | Lanzl et al. | |
| 6,353,600 B1 | 3/2002 | Schwartz et al. | |
| 6,359,714 B1 | 3/2002 | Imajo | 359/179 |
| 6,374,078 B1 | 4/2002 | Williams et al. | |
| 6,374,124 B1 | 4/2002 | Slabinski | |
| 6,405,018 B1 | 6/2002 | Reudink et al. | |
| 6,405,058 B2 | 6/2002 | Bobier | |
| 6,405,308 B1 | 6/2002 | Gupta et al. | |
| 6,438,301 B1 | 8/2002 | Johnson et al. | |
| 6,438,371 B1 | 8/2002 | Fujise et al. | |
| 6,477,154 B1 | 11/2002 | Cheong et al. | |
| 6,486,907 B1 | 11/2002 | Farber et al. | |
| 6,496,290 B1 | 12/2002 | Lee | |
| 6,501,965 B1 | 12/2002 | Lucidarme | |
| 6,504,636 B1 | 1/2003 | Seto et al. | |
| 6,512,478 B1 | 1/2003 | Chien | |
| 6,519,395 B1 | 2/2003 | Bevan et al. | |
| 6,525,855 B1 | 2/2003 | Westbrook et al. | |
| 6,556,551 B1 | 4/2003 | Schwartz | |
| 6,577,794 B1 | 6/2003 | Currie et al. | |
| 6,577,801 B2 | 6/2003 | Broderick et al. | |
| 6,580,905 B1 | 6/2003 | Naidu et al. | |
| 6,580,918 B1 | 6/2003 | Leickel et al. | |
| 6,583,763 B2 | 6/2003 | Judd | |
| 6,594,496 B2 | 7/2003 | Schwartz | |
| 6,597,325 B2 | 7/2003 | Judd et al. | |
| 6,606,430 B2 | 8/2003 | Bartur et al. | |
| 6,634,811 B1 | 10/2003 | Gertel et al. | |
| 6,636,747 B2 | 10/2003 | Harada et al. | |
| 6,640,103 B1 | 10/2003 | Inman et al. | |
| 6,643,437 B1 | 11/2003 | Park | |
| 6,652,158 B2 | 11/2003 | Bartur et al. | |
| 6,654,616 B1 | 11/2003 | Pope, Jr. et al. | |
| 6,675,294 B1 | 1/2004 | Gupta et al. | |
| 6,687,437 B1 | 2/2004 | Starnes et al. | |
| 6,690,328 B2 | 2/2004 | Judd | |
| 6,704,545 B1 | 3/2004 | Wala | |
| 6,710,366 B1 | 3/2004 | Lee et al. | |
| 6,731,880 B2 | 5/2004 | Westbrook et al. | |
| 6,758,913 B1 | 7/2004 | Tunney et al. | |
| 6,771,862 B2 | 8/2004 | Karnik et al. | |
| 6,771,933 B1 | 8/2004 | Eng et al. | |
| 6,784,802 B1 | 8/2004 | Stanescu | |
| 6,785,558 B1 | 8/2004 | Stratford et al. | |
| 6,788,666 B1 | 9/2004 | Linebarger et al. | |
| 6,801,767 B1 | 10/2004 | Schwartz et al. | |
| 6,807,374 B1 | 10/2004 | Imajo et al. | |
| 6,812,824 B1 | 11/2004 | Goldinger et al. | |
| 6,812,905 B2 | 11/2004 | Thomas et al. | |
| 6,826,337 B2 | 11/2004 | Linnell | |
| 6,847,856 B1 | 1/2005 | Bohannon | |
| 6,865,390 B2 | 3/2005 | Goss et al. | |
| 6,873,823 B2 | 3/2005 | Hasarchi et al. | |
| 6,879,290 B1 | 4/2005 | Toutain et al. | |
| 6,883,710 B2 | 4/2005 | Chung | |
| 6,885,846 B1 | 4/2005 | Panasik et al. | |
| 6,889,060 B2 | 5/2005 | Fernando et al. | |
| 6,895,185 B1 * | 5/2005 | Chung et al. | 398/72 |
| 6,909,399 B1 | 6/2005 | Zegelin et al. | |
| 6,915,058 B2 | 7/2005 | Pons | |
| 6,920,330 B2 | 7/2005 | Caronni et al. | |
| 6,924,997 B2 | 8/2005 | Chen et al. | |
| 6,930,987 B1 | 8/2005 | Fukuda et al. | |
| 6,931,183 B2 | 8/2005 | Panak et al. | |
| 6,933,849 B2 | 8/2005 | Sawyer | |
| 6,963,289 B2 | 11/2005 | Aljadeff et al. | |
| 6,963,552 B2 | 11/2005 | Sabat, Jr. et al. | |
| 6,965,718 B2 | 11/2005 | Koertel | |

| Patent/Publication | Date | Inventor |
|---|---|---|
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 7,006,465 B2 | 2/2006 | Toshimitsu et al. |
| 7,013,087 B2 | 3/2006 | Suzuki et al. |
| 7,020,473 B2 | 3/2006 | Splett |
| 7,035,512 B2 | 4/2006 | Van Bijsterveld |
| 7,039,399 B2 | 5/2006 | Fischer |
| 7,047,028 B2 | 5/2006 | Cagenius |
| 7,053,838 B2 | 5/2006 | Judd |
| 7,054,513 B2 | 5/2006 | Herz et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,106,931 B2 | 9/2006 | Sutehall et al. |
| 7,127,176 B2 | 10/2006 | Sasaki |
| 7,142,503 B1 | 11/2006 | Grant et al. |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,359,647 B1* | 4/2008 | Faria et al. ............. 398/171 |
| 7,366,150 B2 | 4/2008 | Lee et al. |
| 7,379,669 B2 | 5/2008 | Kim |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,496,070 B2 | 2/2009 | Vesuna |
| 7,496,384 B2 | 2/2009 | Seto et al. |
| 7,522,552 B2 | 4/2009 | Fein et al. |
| 7,548,695 B2 | 6/2009 | Wake |
| 7,565,170 B2 | 7/2009 | Buscaglia et al. |
| 7,590,354 B2 | 9/2009 | Sauer et al. |
| 2002/0003645 A1 | 1/2002 | Kim et al. |
| 2002/0048071 A1* | 4/2002 | Suzuki et al. ............. 359/173 |
| 2002/0075906 A1 | 6/2002 | Cole et al. |
| 2002/0092347 A1 | 7/2002 | Niekerk et al. |
| 2002/0111192 A1 | 8/2002 | Thomas et al. |
| 2002/0114038 A1 | 8/2002 | Arnon et al. |
| 2002/0126967 A1 | 9/2002 | Panak et al. |
| 2002/0130778 A1 | 9/2002 | Nicholson |
| 2002/0141020 A1 | 10/2002 | Doucet et al. |
| 2002/0181668 A1 | 12/2002 | Masoian et al. |
| 2002/0190845 A1 | 12/2002 | Moore |
| 2003/0007214 A1 | 1/2003 | Aburakawa et al. |
| 2003/0016418 A1 | 1/2003 | Westbrook et al. |
| 2003/0034963 A1 | 2/2003 | Moon et al. |
| 2003/0045284 A1 | 3/2003 | Copley et al. |
| 2003/0078074 A1 | 4/2003 | Sesay et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0179077 A1 | 9/2003 | Hartmann et al. |
| 2003/0202794 A1* | 10/2003 | Izadpanah et al. ............. 398/115 |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0100930 A1 | 5/2004 | Shapira et al. |
| 2004/0110469 A1 | 6/2004 | Judd et al. |
| 2004/0149736 A1 | 8/2004 | Clothier |
| 2004/0151503 A1 | 8/2004 | Kashima et al. |
| 2004/0157623 A1 | 8/2004 | Splett |
| 2004/0162115 A1 | 8/2004 | Smith et al. |
| 2004/0162116 A1 | 8/2004 | Han et al. |
| 2004/0175173 A1 | 9/2004 | Deas |
| 2004/0202257 A1 | 10/2004 | Mehta et al. |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0224644 A1 | 11/2004 | Wu et al. |
| 2004/0233877 A1 | 11/2004 | Lee et al. |
| 2004/0258105 A1 | 12/2004 | Spathas et al. |
| 2004/0264683 A1* | 12/2004 | Bye ............. 379/402 |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0068251 A1 | 3/2005 | Ebling et al. |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0259930 A1 | 11/2005 | Elkins, II et al. |
| 2005/0266797 A1 | 12/2005 | Utsumi et al. |
| 2005/0266854 A1 | 12/2005 | Niiho et al. |
| 2005/0271396 A1 | 12/2005 | Iannelli |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0045054 A1 | 3/2006 | Utsumi et al. |
| 2006/0062579 A1 | 3/2006 | Kim et al. |
| 2006/0094470 A1 | 5/2006 | Wake et al. |
| 2006/0104643 A1 | 5/2006 | Lee et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0233506 A1 | 10/2006 | Noonan et al. |
| 2006/0239630 A1 | 10/2006 | Hase et al. |
| 2006/0279460 A1* | 12/2006 | Yun et al. ............. 342/377 |
| 2007/0009266 A1 | 1/2007 | Bothwell et al. |
| 2007/0019679 A1 | 1/2007 | Scheck et al. |
| 2007/0058978 A1 | 3/2007 | Lee et al. |
| 2007/0093273 A1 | 4/2007 | Cai |
| 2007/0122155 A1 | 5/2007 | Hillis et al. |
| 2007/0149250 A1 | 6/2007 | Crozzoli et al. |
| 2007/0166042 A1* | 7/2007 | Seeds et al. ............. 398/142 |
| 2007/0253714 A1 | 11/2007 | Seeds et al. |
| 2007/0274279 A1 | 11/2007 | Wood et al. |
| 2008/0007453 A1 | 1/2008 | Vassilakis et al. |
| 2008/0013909 A1 | 1/2008 | Kostet |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0056167 A1 | 3/2008 | Kim et al. |

| | | | |
|---|---|---|---|
| 2008/0058018 A1 | 3/2008 | Scheinert | |
| 2008/0119198 A1 | 5/2008 | Hettstedt et al. | |
| 2008/0124086 A1 | 5/2008 | Matthews | |
| 2008/0124087 A1 | 5/2008 | Hartmann et al. | |
| 2008/0137635 A1* | 6/2008 | Pan et al. | 370/345 |
| 2008/0145061 A1 | 6/2008 | Lee et al. | |
| 2008/0150514 A1 | 6/2008 | Codreanu et al. | |
| 2008/0194226 A1 | 8/2008 | Rivas et al. | |
| 2008/0212969 A1 | 9/2008 | Fasshauer et al. | |
| 2008/0219670 A1 | 9/2008 | Kim et al. | |
| 2008/0232799 A1 | 9/2008 | Kim | |
| 2008/0247716 A1 | 10/2008 | Thomas et al. | |
| 2008/0253773 A1 | 10/2008 | Zheng | |
| 2008/0260388 A1 | 10/2008 | Kim et al. | |
| 2008/0273844 A1 | 11/2008 | Kewitsch | |
| 2008/0298813 A1 | 12/2008 | Song et al. | |
| 2008/0304831 A1 | 12/2008 | Miller, II et al. | |
| 2008/0310848 A1 | 12/2008 | Yasuda et al. | |
| 2009/0041413 A1 | 2/2009 | Hurley | |
| 2009/0047023 A1 | 2/2009 | Pescod et al. | |
| 2009/0061939 A1 | 3/2009 | Andersson et al. | |
| 2009/0103919 A1 | 4/2009 | Mickelsson et al. | |
| 2009/0135078 A1 | 5/2009 | Lindmark et al. | |
| 2009/0154621 A1 | 6/2009 | Shapira et al. | |

FOREIGN PATENT DOCUMENTS

| | | |
|---|---|---|
| AU | 731180 | 3/1998 |
| CA | 2065090 C | 4/1992 |
| CA | 2242707 A1 | 1/1999 |
| DE | 20104862 U1 | 8/2001 |
| DE | 10249414 A1 | 5/2004 |
| EP | 0477952 A2 | 4/1992 |
| EP | 0461583 B1 | 3/1997 |
| EP | 0687400 B1 | 11/1998 |
| EP | 0993124 A2 | 4/2000 |
| EP | 1267447 B1 | 1/2001 |
| EP | 1173034 A1 | 4/2001 |
| EP | 1202475 A2 | 5/2002 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1693974 A1 | 8/2006 |
| EP | 1742388 A1 | 1/2007 |
| EP | 1227605 B1 | 1/2008 |
| EP | 1968250 A1 | 9/2008 |
| EP | 1056226 B1 | 4/2009 |
| EP | 1357683 B1 | 5/2009 |
| GB | 2323252 A | 9/1998 |
| GB | 2399963 A | 9/2004 |
| GB | 2428149 A | 1/2007 |
| JP | 05-260018 | 8/1993 |
| JP | 09-083450 | 3/1997 |
| JP | 09-162810 | 6/1997 |
| JP | 09-200840 | 7/1997 |
| JP | 11-68675 | 3/1999 |
| JP | 2000-152300 | 5/2000 |
| JP | 2000-341744 | 12/2000 |
| JP | 2002-264617 | 9/2002 |
| JP | 2003-148653 | 5/2003 |
| JP | 2003-172827 | 6/2003 |
| JP | 2004-172734 | 6/2004 |
| JP | 2004-245963 | 9/2004 |
| JP | 2004-247090 | 9/2004 |
| JP | 2004-264901 | 9/2004 |
| JP | 2004-265624 | 9/2004 |
| JP | 2004-317737 | 11/2004 |
| JP | 2004-349184 | 12/2004 |
| JP | 2005-018175 | 1/2005 |
| JP | 2005-087135 | 4/2005 |
| JP | 2005-134125 | 5/2005 |
| JP | 2007-228603 | 9/2007 |
| JP | 2008-172597 | 7/2008 |
| WO | 0042721 A1 | 7/2000 |
| WO | WO 01/78434 A1 | 10/2001 |
| WO | 0184760 A1 | 11/2001 |
| WO | 0221183 A1 | 3/2002 |
| WO | WO 02/30141 A1 | 4/2002 |
| WO | WO02/102102 A1 | 12/2002 |
| WO | 0324027 A1 | 3/2003 |
| WO | WO03/098175 A1 | 11/2003 |
| WO | WO2004/030154 A2 | 4/2004 |
| WO | WO2004/047472 A1 | 6/2004 |
| WO | 2004059934 A1 | 7/2004 |
| WO | WO 2004/056019 A1 | 7/2004 |
| WO | WO2004/086795 A2 | 10/2004 |
| WO | WO 2004/093471 A2 | 10/2004 |
| WO | WO 2005/062505 A1 | 7/2005 |
| WO | WO2005/069203 A2 | 7/2005 |
| WO | WO2005/073897 A1 | 8/2005 |
| WO | WO2005/079386 A2 | 9/2005 |
| WO | WO2005/101701 A2 | 10/2005 |
| WO | WO2005/111959 A2 | 11/2005 |
| WO | 2006/011778 A1 | 2/2006 |
| WO | 2006/018592 A1 | 2/2006 |
| WO | WO2006/019392 A1 | 2/2006 |
| WO | 2006039941 A1 | 4/2006 |
| WO | 2006051262 A1 | 5/2006 |
| WO | 2006133609 A1 | 12/2006 |
| WO | WO2006136811 A1 | 12/2006 |
| WO | 2007048427 A1 | 5/2007 |
| WO | 2007/077451 A1 | 7/2007 |
| WO | 2007/091026 A1 | 8/2007 |
| WO | 2007088561 A1 | 8/2007 |
| WO | 2008008249 A2 | 1/2008 |
| WO | 2008027213 A2 | 3/2008 |
| WO | WO2008/033298 A2 | 3/2008 |
| WO | 2008021442 A3 | 4/2008 |
| WO | 2008039830 A2 | 4/2008 |
| WO | 2006046088 A1 | 5/2009 |

OTHER PUBLICATIONS

Liu, et al., "Broadband Access Using Wireless-Over-Fibre Technologies," BT Technology Journal, vol. 24 No. 3, Jul. 2006, pp. 130-143.
Patent Cooperation Treaty, International Search Report for International Application No. PCT/US08/010878, Dec. 23, 2008, 2 pages.
Cooper, A.J., "Fiber/Radio for the Provision of Cordless/Mobile Telephony Services in the Access Network," Electronics Letters, vol. 26, pp. 2054-56, 1990.
Bakaul, M. et al., "Efficient Multiplexing Scheme for Wavelength-Interleaved DWDM Millimeter-Wave Fiber-Radio Systems," IEEE Photonics Technology Letters, vol. 17, No. 12, Dec. 2005.
D. Huang, C. Chiu, "A WLAN-Used Helical Antenna Fully Integrated with the PCMCIA Carrier," IEEE Trans. Ant. and Prop., vol. 53, No. 12, pp. 4164-4168, Dec. 2005.
Gibson et al., "Evanescent Field Analysis of Air-Silica Microstructure Waveguides," IEEE, 1-7803-7104-4/01, 2001, pp. 709-710.
ITU-T G.652, Telecommunication Standardization Sector of ITU, Jun. 2005, Series G: Transmission Systems and Media, Digital Systems and Networks, Transmission Media and Optical Systems Characteristics—Optical Fiber Cables, Characteristics of a Single-Mode Optical Fiber and Cable, ITU-T Recommendation G.652, 22 pages.
ITU-T G.657, Telecommunication Standardization Sector of ITU, Dec. 2006, Series G: Transmission Systems and Media, Digital Systems and Networks, Transmission Media and Optical Systems Characteristics—Optical Fiber Cables, Characteristics of a Bending Loss Insensitive Single Mode Optical Fiber and Cable for the Access Network, ITU-T Recommendation G.657, 20 pages.
Kojucharow, K. et al., "Millimeter-Wave Signal Properties Resulting from Electrooptical Upconversion," IEEE Transaction on Microwave Theory and Techniques, vol. 49, No. 10, Oct. 2001, pp. 1977-1985.
Monro et al., "Holey Fibers with Random Cladding Distributions," Optics Letters, vol. 25, No. 4, Feb. 15, 2000.
Moreira, J.D. et al., "Diversity Techniques for OFDM Based WLAN Systems,", pp. 1008-1011, PIMRC 2002 IEEE.
Niiho, T. et al., "Multi-Channel Wireless LAN Distributed Antenna System Based on Radio-Over-Fiber Techniques," Lasers and Electro-Optics Society 2004, LEOS 2004, The 17th Annual Meeting of the IEEE, vol. 1, Nov. 7-11, 2004, pp. 57-58.

Paulraj, A. et al., "An Overview of MIMO Communications—A Key to Gigabit Wireless," Proceedings of the IEEE, vol. 92, No. 2, Feb. 2004.

Pickrell et al., "Novel Techniques for the Fabrication of Holey Optical Fibers," Spie Conference Proceedings, vol. 4578, pp. 271-282, 2001.

RFID Technology Overview, 11 pages.

Roh, W. and Paulraj, A., "MIMO Channel Capacity for the Distributed Antenna Systems," Vehicular Technology Conference, 2002, proceedings, VTC 2002—Fall, 2002 IEEE 56th, vol. 2, Sep. 24-28, 2002, pp. 706-709.

Seto, I. et al., "Antenna-Selective Trasmit Diversity Technique for OFDM-Based WLANs with Dual-Band Printed Antennas," pp. 51-56, IEEE Communications Society/WCNC 2005.

Shen, C., Zhou, S., and Yao, Y., "Comparison of Channel Capacity for MIMO-DAS versus MIMO-CAS," Communications, 2003, APCC 2003, The 9th Asia-Pacific Conference, vol. 1, Sep. 21-24, 2003, pp. 113-118.

Wake, D. et al., "Passive Picocell: A New Concept in Wireless Network Infrastructure," Electronics Letters, vol. 33, No. 5, Feb. 27, 1997, pp. 404-406.

Winters, J., Salz, J., and Gitlin, R., "The Impact of Antenna Diversity on the Capacity of Wireless Communications Systems," IEEE Transcations on Communications, vol. 42, No. 2/3/4, Feb./Mar./Apr. 1994.

* cited by examiner

HYBRID WIRELESS/WIRED ROF TRANSPONDER AND HYBRID ROF COMMUNICATION SYSTEM USING SAME

BACKGROUND OF THE INVENTION

1. Field of the Invention

The present invention relates generally to wireless and wired communication systems, and in particular relates to radio-over-fiber (RoF) communication systems that employ wired and/or wireless technology.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (coffee shops, airports, libraries, etc.). Wireless communication systems communicate with wireless devices called "clients," which must reside within the wireless range or "cell coverage area" in order to communicate with the access point device.

One approach to deploying a wireless communication system involves the use of "cells," which are radio-frequency (RF) coverage areas. Cells can have relatively large radii (e.g., 1000 m) or can have relatively small radii ("picocells") in the range from about a few meters up to about 20 meters. Because a picocell covers a small area, there are typically only a few users (clients) per picocell. Picocells also allow for selective wireless coverage in small regions that otherwise would have poor signal strength when covered by larger cells created by conventional base stations.

The essential components that make up a RoF wireless cellular system are a head-end controller ("head end"), one or more optical fiber cables, and one or more transponders. The optical fiber cables are connected at one end to the head-end controller. The transponders are optically coupled to the optical fiber cables along the length of the cables. The optical fiber cables have downlink and uplink optical fibers that carry RoF optical signals between the transponders and the head end. The transponders convert RoF optical signals to electrical signals and vice versa to create the corresponding one or more cells. The transponders include one or more antennas that transmit and receive RF free-space electromagnetic (EM) signals to and from the client devices within the corresponding cell. Combining a number of transponders creates an array of cells that cover an area called a "cellular coverage area." A closely packed array of picocells forms a picocellular coverage area that provides high per-user data-throughput.

While RoF wireless cellular and picocellular systems are robust, it is desirable to be able to provide state-of-the-art wireless and wired services to end-users—for instance, in present day technology terms, a wireless RoF infrastructure with IEEE 802.11a/b/g/n along with Gigabit Wireline Ethernet, and a wired infrastructure with IEEE 802.3/u./z (where IEEE 802.3 is 10 Mbps, IEEE 802.3u is 100 Mbps and IEEE 802.3z is 1 Gbps). The traditional way of achieving this is through two separate wireless and wired network infrastructures, which is costly and complicated to deploy and maintain.

What is needed is an approach that allows for both wireless and wired services to be provided to end-users without the complexity and cost of having to deploy two separate communication systems.

SUMMARY OF THE INVENTION

One aspect of the invention is a hybrid transponder for distributing wireless and wired signals from a hybrid head end to at least one client device. The hybrid transponder includes a hybrid converter adapted to convert wireless and wired optical signals from the head-end unit to corresponding wired and wireless electrical signals, and vice versa. The hybrid transponder also includes a frequency multiplexer/demultiplexer (M/D) electrically connected to the converter and adapted to multiplex and demultiplex the wired and wireless electrical signals. An antenna system is electrically connected to the frequency M/D via a signal-directing element configured to allow the antenna system to transmit and receive wireless signals from the at least one client device. A wireline cable port, such as a standard Ethernet port, is electrically connected to the frequency M/D and is adapted to connect to a wireline cable (e.g., an Ethernet cable) to carry wired electrical signals to and from the at least one client device. Further embodiments of the present invention comprise wireline cables and cable ports that carry optical signals to and from the at least one client device. The hybrid transponder thus allows for both wired and wireless communication between one or more client devices and the hybrid head end. In an example embodiment, one client device wirelessly communicates via the hybrid transponder while another client device wire-communicates via the hybrid transponder. In another example embodiment, the same client device both wire-communicates and wirelessly communicates via the hybrid transponder.

Another aspect of the invention is a method of providing wired and wireless connectivity to at least one client device from a hybrid head-end. The method includes deploying at least one hybrid transponder optically coupled to the head-end unit and adapted to convert optical wired and wireless signals from the hybrid head-end into corresponding electrical wired and wireless signals. The method also includes, in the at least one hybrid transponder, directing the electrical wireless signals to a multiple-input/multiple-output (MIMO) antenna system so as to wirelessly communicate with the at least one client device. The method also included directing the electrical wired signals to a wireline cable port and to the client device via a wireline cable operably connecting the transponder to the at least one client device.

Another aspect of the invention is a hybrid RoF communication system capable of providing wireless and wired connectivity to at least one client device. The system includes a hybrid head-end adapted to transmit and receive wired and wireless optical signals over an optical fiber cable. At least one hybrid transponder is optically coupled to the optical fiber cable and is configured to convert wired and wireless optical signals to corresponding wired and wireless electrical signals and vice versa. The hybrid transponder is configured to wirelessly transmit the wireless electrical signals to the at least one client device via an antenna system, and to wire-transmit the wired signals to the at least one client device via a wireline cable that operably connects the hybrid transponder to the at least one client device. In an example embodiment, the system provides a wired connection to one client device and a wireless connection to another client device that both reside within a cell of the system.

Additional features and advantages of the invention are set forth in the detailed description that follows, and will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

Accordingly, various basic electronic circuit elements and signal-conditioning components, such as bias tees, RF filters, amplifiers, power dividers, etc., are not all shown in the Figures for ease of explanation and illustration. The application of such basic electronic circuit elements and components to the devices and systems of the present invention will be apparent to one skilled in the art.

DETAILED DESCRIPTION OF THE PREFERRED EMBODIMENTS

Reference is now made in detail to the present preferred embodiments of the invention, examples of which are illustrated in the accompanying drawings. Whenever possible, the same or analogous reference numbers are used throughout the drawings to refer to the same or like parts.

The present invention is directed to a hybrid wireless/wired RoF communication system (hereinafter "hybrid RoF system" for short) that provides both wireless and wired network connectivity. The system is designed to provide a wireless connection with MIMO capability, such as IEEE 802.11n, along with a high-data-rate wired connection, such as Wireline Ethernet or a fiber optic wireline cable. An example of the hybrid RoF system of the present invention combines wireless and wired network infrastructures into a single hybrid RoF system (e.g., network) with multimode optical fibers carrying IEEE 802.11a/b/g/n, and ultra wide band (UWB) signals, along with base-band gigabit wireline Ethernet signals (e.g., IEEE 802.3z@1 Gbps).

In the description below, a "wireless" signal is that associated with providing wireless communication, and a "wired" signal is that associated with providing baseband wired communication. Both "wireless" and "wired" signals can be electrical or optical, while the wireless signals can additionally be free-space electromagnetic signals of the type normally associated with "wireless" (i.e., non-wired) communications.

Also in the description below, the acronym LAN stands for "local area network," and the acronym WLAN stands for "wireless local area network."

Generalized Optical-Fiber-Based Wireless System

Figure 1:
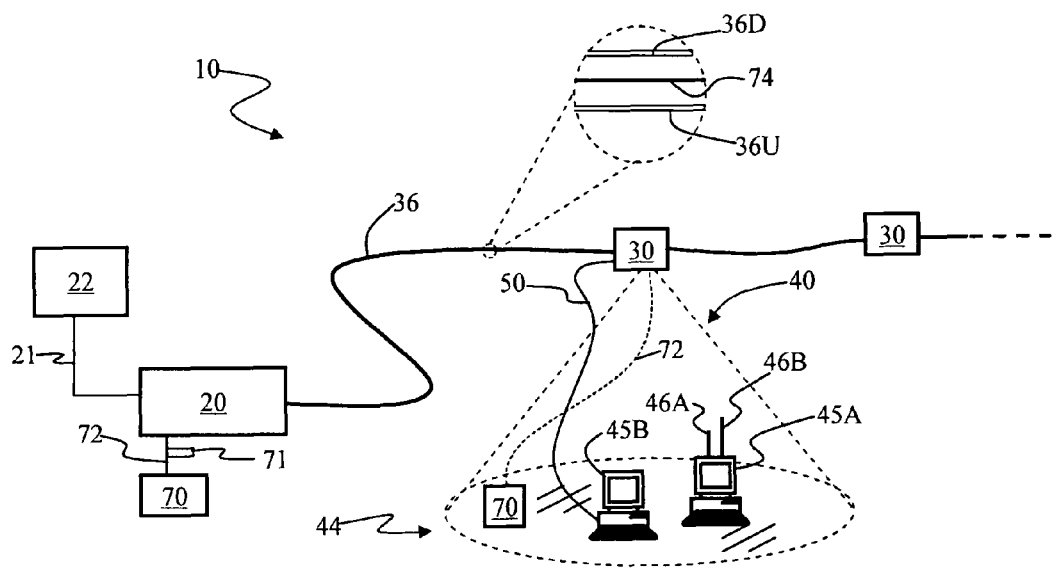
FIG. 1 is a schematic diagram of a generalized embodiment of a hybrid RoF wireless/wired communication system ("hybrid RoF system") according to the present invention showing a hybrid head-end optically coupled to at least one hybrid transponder via an optical fiber cable, and showing a cell (picocell) formed by one of the hybrid transponders and two client devices within the picocell.

FIG. 1 is a schematic diagram of a generalized embodiment of a hybrid RoF system 10 according to the present invention. Hybrid RoF system 10 includes a hybrid head-end 20, at least one hybrid transponder unit ("transponder") 30 configured to handle both wireless and wired signals, and an optical fiber cable 36 that optically couples the hybrid head-end to the at least one hybrid transponder. Hybrid head-end 20 is operably connected via a communication link 21 to an external source 22, such as an optical communication network or other network architecture backbone, the Internet, etc.

As shown in the close-up view in FIG. 1, in an example embodiment optical fiber cable 36 includes one or more optical fibers, and in a particular example embodiment includes a downlink optical fiber 36D and an uplink optical fiber 36U. In an example embodiment, the present invention employs multi-mode optical fibers for the downlink and uplink optical fibers 36D and 36U. In a more specific example embodiment, OM3 50 μm multi-mode optical fibers are used for downlink and uplink optical fibers 36D and 36U. In another example embodiment downlink optical fiber 36D and/or uplink optical fiber 36U can comprise one or more individual optical fibers. In FIG. 1, individual optical fibers are shown for downlink and uplink optical fibers 36D and 36U by way of example and for ease of illustration.

In an example embodiment, one of the optical fibers in 36D and/or in 36U is used for wireless signals, while another of the optical fibers in 36D and/or in 36U is used for wired signals. Likewise, in another example embodiment, one of the optical fibers is used for one type of signal, while the other carries both signal types. For the sake of illustration and ease of discussion, downlink optical fibers in 36D are assumed to carry downlink optical wireless and wired signals from hybrid head-end 20 to hybrid transponder 30, while uplink optical fibers in 36U are assumed to carry uplink optical wireless and wired signals from the hybrid transponder to the hybrid head-end.

Hybrid RoF system 10 forms at each hybrid transponder 30 a cell 40 substantially centered about the corresponding hybrid transponder. In example embodiments, a cell 40 can be relatively large (e.g., 1000 m radius) or can be a picocell ranging anywhere from about a meter across to about twenty meters across. One or more cells 40 associated with the at least one hybrid transponder form a cellular coverage area 44. In the remainder of the discussion below, for the sake of illustration, cell 40 is assumed to be a "picocell" and coverage area 44 is assumed to be a "picocell coverage area."

Hybrid transponder 30 is also adapted to provide wired communication via a wireline cable 50, such as an Ethernet wire-based cable or an optical fiber cable. Hybrid head-end 20 is adapted to perform or to facilitate any one of a number of RoF applications, such as radio-frequency identification (RFID), wireless local-area network (WLAN) communication (Ethernet signals), and/or cellular phone service.

With continuing reference to FIG. 1, there is shown within picocell 40 two client devices 45 (45A and 45B), shown in the form of computers by way of example. An example embodiment of client device 45A includes two antennas 46A and 46B (e.g., a multi-antenna wireless card) adapted to receive and/or send free-space electromagnetic signals, while client device 45B is wire-connected to the transponder via wireline cable 50. Client device 45A is thus adapted for multiple-input/multiple-output (MIMO) communication with hybrid head-end 20 via hybrid transponder 30.

In an example embodiment, hybrid RoF system 10 also includes a power supply 70 that generates an electrical power signal 71. In an example embodiment, power supply 70 is located at and is electrically coupled to head-end unit 20 via an electrical power line 72, and powers the power-consuming elements therein. In an example embodiment, an electrical power line 74 runs through hybrid head-end 20 and over to the at least one hybrid transponder 30 and powers not only the power-consuming elements in the hybrid head-end but also the power-consuming elements in at least one hybrid transponder, such as the O/E and E/O converters, as described below. In an example embodiment, electrical power line 74 includes two wires 74A and 74B that carry a single voltage and that are electrically coupled to a DC power converter 180 at transponder 30 (DC power converter 180 is discussed in greater detail below in connection with FIG. 5).

In an example embodiment, a power supply 70 is provided locally to one or more of the hybrid transponders and provides electrical power directly to one or more of the local hybrid transponders via electrical power line(s) 72 rather than via optical fiber cable 36. In an example embodiment, electrical power line 74 (or a branch thereof) is included in wireline cable 50, thereby allowing hybrid RoF system 10 to provide Power-over-Ethernet via hybrid transponder 30.

In an example embodiment, hybrid RoF system 10 employs a known telecommunications wavelength, such as 850 nm, 1300 nm, or 1550 nm. In another example embodiment, hybrid RoF system 10 employs other less common but suitable wavelengths such as 980 nm.

Hybrid Head-End

Figure 2:
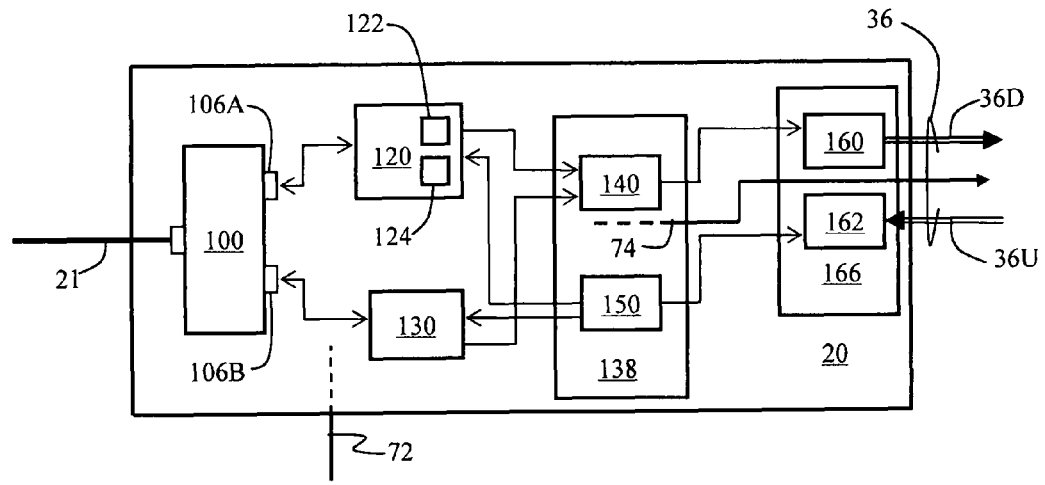
FIG. 2 is a detailed schematic diagram of an example embodiment of the hybrid head-end of the hybrid RoF system of FIG. 1.

FIG. 2 is a detailed schematic diagram of an example embodiment of hybrid head-end 20 of FIG. 1. Hybrid head-end 20 includes a switch 100 having first and second input/output (I/O) sides 102 and 104. I/O side 102 is operably coupled to communication link 21 at an I/O port 103. In an example embodiment, communication link 21 is or otherwise includes a high-speed (e.g., 10 Gbps) Ethernet link. I/O side 104 includes a number of I/O ports 106. In an example embodiment, I/O ports 106 are lower-speed ports (e.g., ten 1 Gbps ports to handle ten Gbps Ethernet signals from different wires carried by communication link 21). Two I/O ports 106A and 106B are shown for the sake of illustration.

I/O port 106A is electrically connected to a wireless-signal converter 120, while I/O port 106B is electrically connected to a wired-signal converter 130. In an example embodiment, wireless-signal converter 120 includes an amplifier/filter electronics unit ("A/F electronics") 122 that amplifies and filters the wireless signals, as explained below. Hybrid head end unit 20 also includes a frequency multiplexer/demultiplexer (M/D) 138 that in an example embodiment includes a frequency combiner 140 and a frequency splitter 150. Frequency M/D 138 is electrically connected to A/F electronics 122 and converter 130.

Hybrid head end 20 also includes an electrical-to-optical (E/O) converter 160 electrically coupled to frequency combiner 140 of frequency MID 138. E/O converter 160 is adapted to receive electrical signals from frequency combiner 140 and convert them to corresponding optical signals, as discussed in greater detail below. In an example embodiment, E/O converter 160 includes a laser suitable for delivering sufficient dynamic range for RoF applications, and optionally includes a laser driver/amplifier (not shown) electrically coupled to the laser. Examples of suitable lasers for E/O converter 160 include laser diodes, distributed feedback (DFB) lasers, Fabry-Perot (FP) lasers, and vertical cavity surface emitting lasers (VCSELs), such as 850 nm commercially available VCSELs specified for 10 Gbps data transmission. E/O converter 160 is optically coupled to optical fiber cable 36 and downlink optical fiber(s) 36D carried therein.

Hybrid head-end 20 also includes an optical-to-electrical (O/E) converter 162 electrically coupled to frequency splitter 150 of frequency M/D 138 and to optical fiber cable 36 and uplink optical fiber 36U carried therein. O/E converter 162 is adapted to receive optical signals and convert them to corresponding electrical signals. In an example embodiment, O/E converter 162 is or otherwise includes a photodetector, or a photodetector electrically coupled to a linear amplifier. E/O converter 160 and O/E converter 162 constitute a converter pair unit ("converter unit") 166 that converts electrical signals to optical signals and vice versa.

Figure 3:
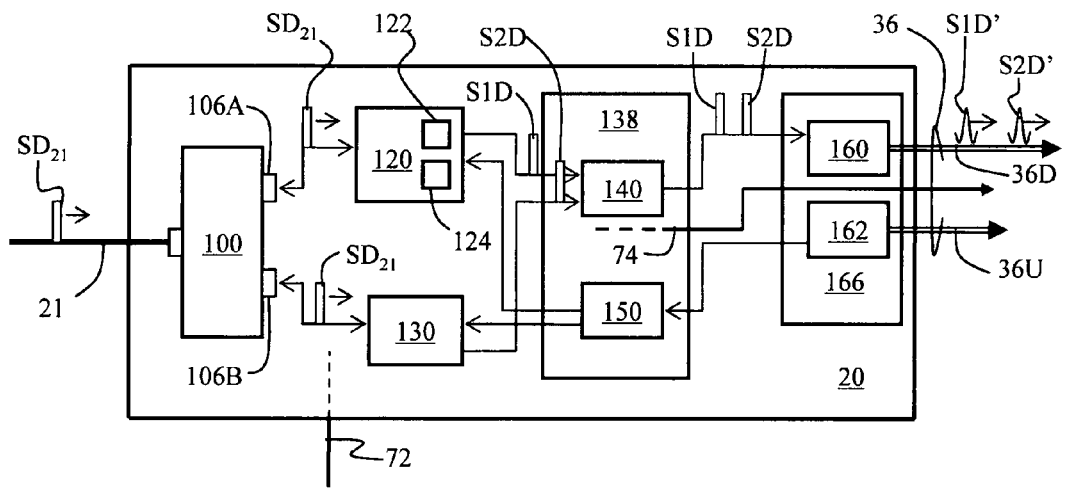
FIG. 3 and FIG. 4 are the same as FIG. 2, and respectively show the various downlink and uplink wireless and wired signals.

With reference now to FIG. 3, in an example embodiment of the operation of hybrid head-end 20, communication link 21 carries signals $S_{21}$ that include downlink and uplink digital signals $SD_{21}$ and $SU_{21}$. Downlink digital signals $SD_{21}$ originate, for example, from an external source 22. Digital signals $S_{21}$ may include a variety of different signal types, such as data, voice, video, etc. Certain types of these signals, such as high-bandwidth video signals, have relatively high data rates and so are best transmitted to an end-user via a wired connection. On the other hand, certain ones of these signals have relatively low data rates, such as low-bandwidth voice signals, and so can be transmitted to an end-user via a wireless signal.

Downlink signals $SD_{21}$ enter hybrid head-end 20 and encounter switch 100. Switch 100 is adapted to direct certain signals $SD_{21}$ most suitable for wireless transmission to wireless-signal converter 120 and to direct the other signals $SD_{21}$ suitable for wired transmission to wired-signal converter 130. Wireless-signal converter 120 receives the signals $SD_{21}$ directed to it and converts them into downlink "wireless signals" S1D. Specifically, wireless-signal converter 120 phase modulates and/or amplitude modulates signals $SD_{21}$ onto an RF carrier signal, e.g., a 2.4 GHz or 5 GHz RF carrier signal, resulting in downlink wireless signals S1D. Wireless-signal converter 120 also amplifies and filters wireless signals S1D using A/F electronics 122. In an example embodiment, wireless-signal converter 120 is configured to adapt the transmission protocol for wireless communication (e.g., Ethernet wireless protocol 802.3 to wireless LAN protocol 802.11).

Meanwhile, wired-signal converter 130 receives the signals $SD_{21}$ directed to it and processes (e.g., filters) these signals to make them compatible for transmission over the hybrid system. For example, downlink signals $SD_{21}$ are twisted-pair transmit Ethernet data signals, and wired-signal converter 130 interfaces signals $SD_{21}$ to make them compatible with the corresponding single-ended signal versions, while rejecting any power-over-Ethernet DC signals that may be present. This results in downlink wired signals S2D.

Generally, wireless signals S1D have a higher frequency than wired signals S2D so that these two signal types can be frequency multiplexed and demultiplexed. Accordingly, wireless signals S1D and wired signals S2D proceed to frequency M/D 138 and frequency combiner 140 therein, which combines (multiplexes) the different-frequency signals S1D and S2D onto a common electrical line connected to E/O converter 160 in converter pair unit 166. E/O converter 160 then converts downlink electrical wireless signals S1D into a corresponding optical signals S1D' and converts downlink electrical wired signal S2D into a corresponding optical signal S2D'. In an example embodiment, E/O converter 160 is configured to modulate the wireless and wired optical signals onto a single optical carrier. Both wireless and wired optical signals S1D' and S2D' are carried by downlink optical fiber 36D and travel to hybrid transponder 30.

Figure 4:
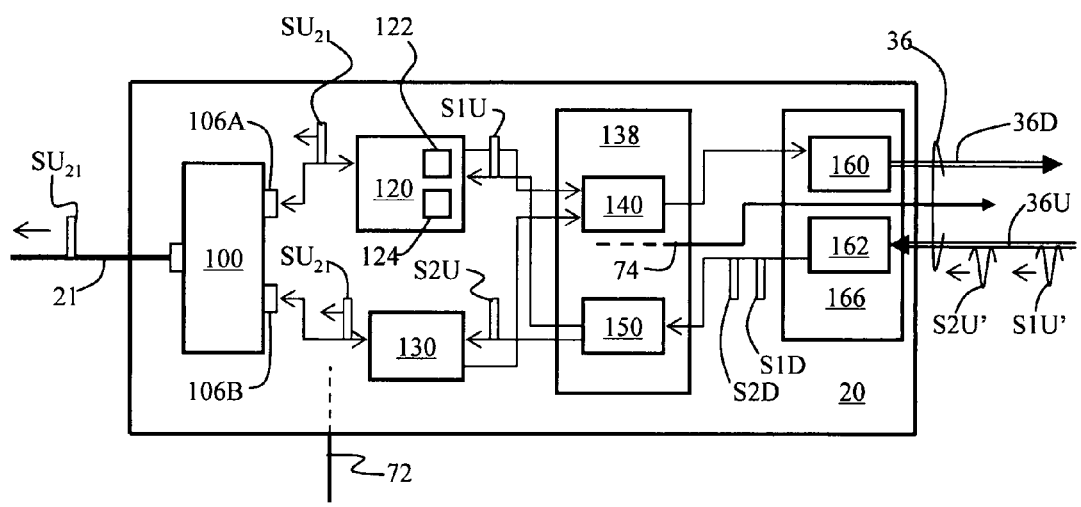

With reference now to FIG. 4, hybrid head-end 20 also receives uplink optical wireless signals S1U' and uplink optical wired signals S2U' from transponder 30, as described below. These signals travel from hybrid transponder 30 over uplink optical fiber 36U and are received by O/E converter 162 in converter unit 166, which converts these signals into corresponding uplink electrical wireless and wired signals S1U and S2U. Frequency splitter 150 in frequency M/D 138 splits (i.e., demultiplexes) these signals to follow two different electrical paths wherein that wireless signal S1U travels to wireless-signal converter 120, while wired signal S2U travels to wired-signal converter 130. Wireless-signal converter 120 then operates on the wireless signal S2U it receives and extracts signals $SU_{21}$ from the RF carrier. Likewise, wired-signal converter 130 processes wired signals S2U it receives to form signals $SU_{21}$. For example, wired signals S2U are converted by wired-signal converter 130 to twisted pair receive Ethernet data signals.

Signals $SU_{21}$ from converters 120 and 130 then travel to switch 100, which directs these signals onto communication link 21. In an example embodiment, not all signals $SU_{21}$ are directed to communication link 21. For example, repeater-cellular signals would not need to go through switch 100 but rather would be directed to a separate processing unit (not shown).

Hybrid Transponder

Figure 5:
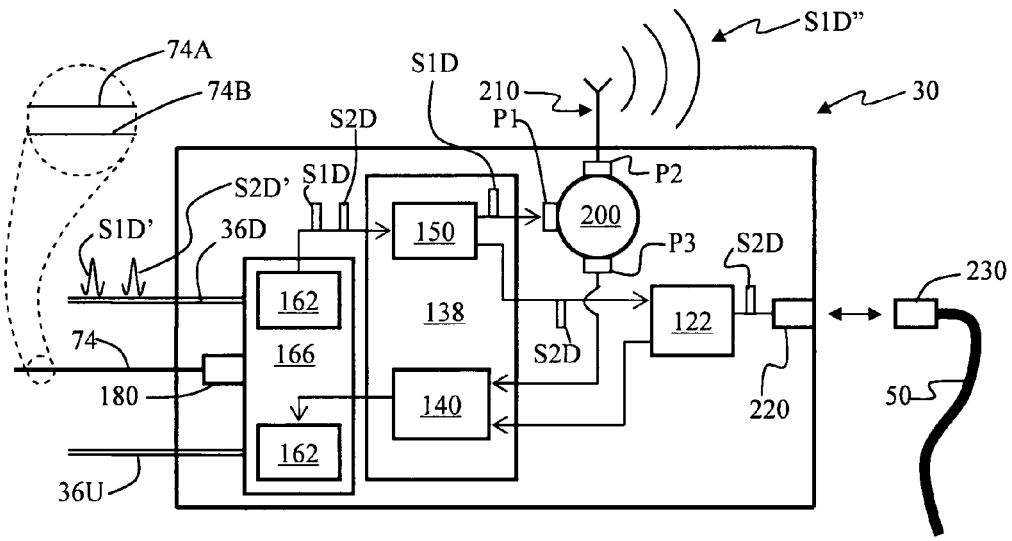
FIG. 5 is a detailed schematic diagram of an example embodiment of the hybrid transponder of the system of FIG. 1, showing the various optical and electrical downlink wireless and wired signals transmitted to and received from the hybrid head-end, and also showing the wireline cable that provides wired communication to a client device.
Figure 6:
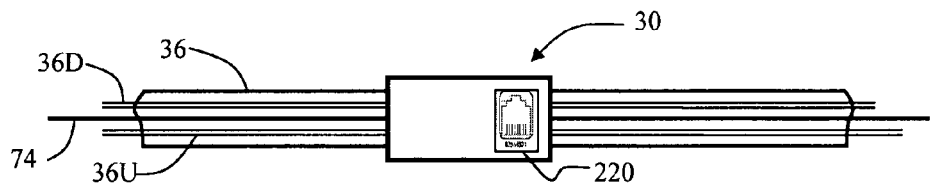
FIG. 6 is a schematic diagram illustrating a hybrid transponder incorporated with the optical fiber cable that has downlink and uplink optical fibers, and showing an Ethernet-type wireline cable port in the transponder.

FIG. 5 is a schematic diagram of an example embodiment of hybrid transponder 30 according to the present invention. FIG. 6 is a schematic diagram of hybrid transponder 30 shown incorporated with optical fiber cable 36.

Hybrid transponder 30 of the present invention differs from the typical access point device associated with wireless communication systems in that the preferred embodiment of the transponder has just a few signal-conditioning elements and no digital information processing capability with respect to the transmitted/received wired and wireless signals. This allows hybrid transponder 30 to be very compact and virtually maintenance free. In addition, the preferred example embodiment of hybrid transponder 30 consumes very little power, is transparent to signals, and does not require a local power source. Hybrid transponder 30 also is configured to provide a wired connection to client device 45 either within picocell 40 of the particular hybrid transponder, or outside of this picocell.

Hybrid transponder 30 includes a converter unit 166 wherein O/E converter 162 is optically coupled to downlink optical fiber 36D while E/O converter 160 is optically coupled to uplink optical fiber 36U. O/E converter 162 is electrically connected to a frequency M/D 138 and specifically frequency splitter 150 therein. E/O converter 160 is also electrically connected to frequency M/D 138 and specifically to frequency combiner 140 therein. Both frequency splitter 150 and frequency combiner 140 are electrically connected to A/F electronics 122. Frequency splitter 150 of frequency M/D 138 is also electrically connected to port P1 of a three-port signal-directing element 200 having additional ports P2 and P3. In an example embodiment, signal-directing element 200 is a circulator.

An antenna system 210 is electrically connected to input/output port P2 of signal-directing element 200, while frequency combiner 140 of frequency M/D 138 is electrically connected to output port P3. In an example embodiment, antenna system 210 includes one or more patch antennas, such as disclosed in U.S. patent application Ser. No. 11/504,999 filed on Aug. 16, 2006 and assigned to the present assignee. Also in an example embodiment, antenna system 210 is configured for MIMO communication with one or more client devices within picocell 40 (or more generally within the picocell coverage area 44 formed by one or more transponders). Antenna system 210 is discussed in greater detail below.

A/F electronics 122 is electrically coupled to a wireline cable port 220, which in an example embodiment is or otherwise includes an Ethernet cable port. Cable port 220 is adapted to receive a cable connector 230 of a wireline cable 50, such as an Ethernet cable connector (plug) and Ethernet cable, that leads to a wired client 45 (see FIG. 1). In an example embodiment, cable port 220 is a gigabit Ethernet wireline port and wireline cable 50 is an Ethernet cable. In an example embodiment, electrical power line 74 is operably accessible at cable port 220 and wireline cable 50 includes a section of electrical power line 74 so as to provide Power-over-Ethernet via transponder 30 at the wireline cable port.

In an example embodiment, aforementioned DC power converter 180 is electrically coupled to converter unit 166 and changes the voltage or levels of electrical power signal 71 to the power level(s) required by the power-consuming components in transponder 30. In an example embodiment, DC power converter 180 is either a DC/DC power converter, or an AC/DC power converter, depending on the type of power signal 71 carried by electrical power line 74. In an example embodiment, electrical power line 74 includes standard electrical-power-carrying electrical wire(s), e.g., 18-26 AWG (American Wire Gauge) used in standard telecommunications and other applications.

With reference again also to FIG. 1, in another example embodiment, electrical power line 72 (dashed line) runs from a local power supply 70 to hybrid transponder 30 (e.g., through a section of optical communication link 36 or straight to the hybrid transponder) rather than from or through head end 20 via optical fiber cable 36, such as electrical power line 74. In another example embodiment, electrical power line 72 or 74 includes more than two wires and carries multiple voltages.

Hybrid Transponder Operation

Hybrid transponder 30 is configured to provide both a wireless and wired connection to at least one client device 45. Thus, with reference to FIG. 5, in the operation of hybrid transponder 30, downlink optical wireless and wired signals S1D' and S2D' travel from head end unit 20 over downlink optical fiber 36D to O/E converter 162 in converter unit 166 of the hybrid transponder. O/E converter 162 converts optical signal S1D' and S2D' back into their electrical counterparts S1D and S2D. Electrical signals S1D and S2D travel to frequency M/D 138 and to frequency splitter 150 therein, which demultiplexes these signals, with wireless signal S1D sent to signal-directing element 200, and wired signal S2D sent to A/F electronics 122 and then to wireline cable port 220.

Signal-directing element 200 directs signal S1D to antenna system 210, causing it to transmit a corresponding downlink free-space electromagnetic wireless signal S1D". Because client device 45A is within picocell 40, signal S1D" is received by client device antenna 46A or 46B (say, antenna 46A), which antennas may both be part of a wireless card, or a cell phone antenna, for example. Antenna 46A converts electromagnetic signal S1D" into its counterpart electrical signal S1D in the client device (signal S1D is not shown therein). Client device 45A then processes electrical signal S1D, e.g., stores the signal information in memory, displays the information as an e-mail or text message, etc. Meanwhile, wired signals S2D travel over wireline cable 50 to client device 45B (see FIG. 1) and are processed therein.

Figure 7:
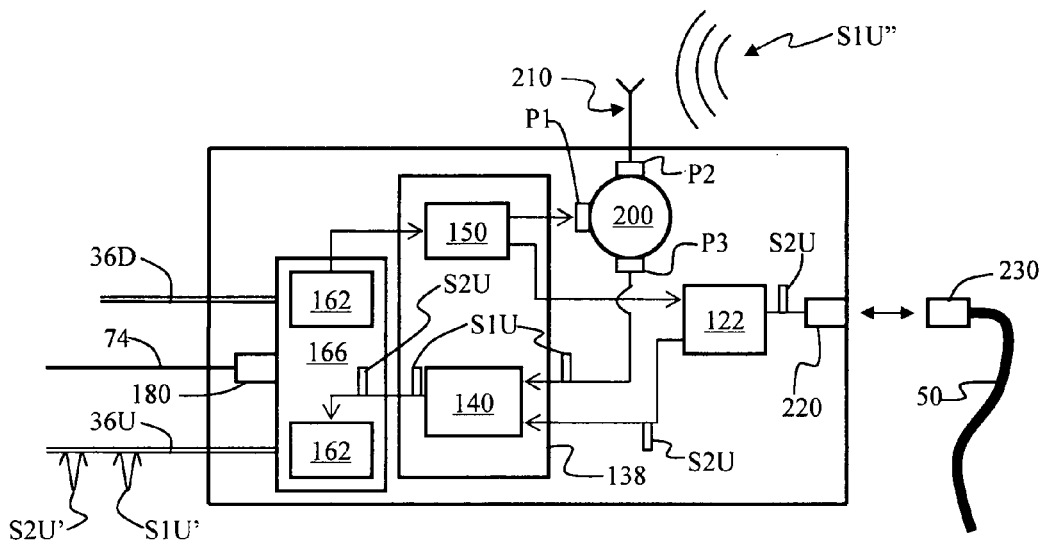
FIG. 7 is the schematic diagram of FIG. 5, but showing the various uplink optical and electrical wireless and wired signals.

With reference now to FIG. 7, in an example embodiment, client device 45A (FIG. 1) generates an uplink electrical wireless signal S1U (not shown in the client device), which is converted into a corresponding free-space electromagnetic signal S1U" by antenna 46A. Because client device 45A is located within picocell 40, electromagnetic signal S1U" is detected by transponder antenna system 210, which converts this signal back into electrical signal S1U. Meanwhile, client device 45B also transmits wired uplink signals S2U to hybrid transponder 30 via wireline cable 50.

Signal S1U is then directed by signal-directing element 200 out of port P3 to frequency M/D 138 and frequency combiner 140 therein. Meanwhile, signal S2U is amplified and filtered by A/F electronics 122 and provided to frequency M/D 138 and to frequency combiner 140 therein. Frequency combiner 140 combines (multiplexes) signals S1U and S2U and provides them to E/O converter 160. E/O converter 160 converts these electrical signals into corresponding optical signals S1U' and S2U'. These optical signals then travel over uplink optical fiber 36U to hybrid head-end unit 20, where they are received and processed in the manner described above.

MIMO Operation

Figure 8:
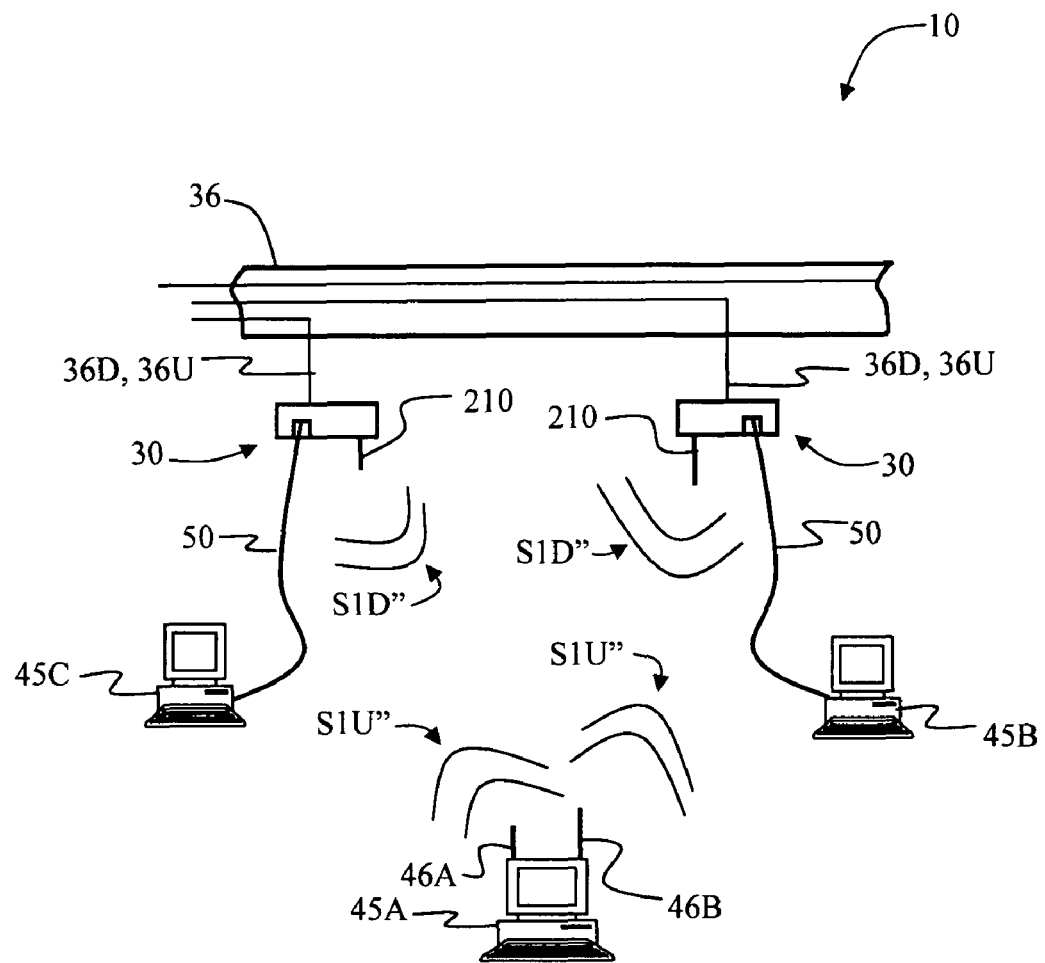
FIG. 8 is a schematic diagram of the transponder end of the hybrid RoF system of the present invention, showing two transponders and three client devices, including a multiple-input/multiple-output (MIMO) client device in wireless communication with one or both hybrid transponders, and two other client devices in wired communication with the respective hybrid transponders.

In a preferred embodiment, hybrid RoF system 10 is configured to support MIMO operation. FIG. 8 is a schematic diagram of the transponder end of hybrid RoF system 10 illustrating an example embodiment of the system, where client device 45A includes two antennas 46A and 46B. This configuration allows for 2×2 MIMO wireless communication with client 45A while also providing wired communication with clients 45B and 45C with downlink and uplink electrical wired signals S2D and S2U.

Hybrid RoF system 10 can be set to one of a number of various MIMO configurations, such as 1×2, 2×1, 2×3, 3×2, 3×3 3×4, 4×3, 4×4, etc., depending on particular antenna system 210 configurations and the number of antennas available on the particular client device(s). An example embodiment of a client device having multiple antennas and MIMO capability is a laptop computer with a multiple-antenna MIMO wireless card.

Generally speaking, in a MIMO application downlink electrical wireless signals S1D and corresponding uplink signals S1U are in the form of bit streams. For MIMO applications, each transponder antenna system and each client antenna system serve as both transmitting and receiving antennas that transmit and receive bit-stream segments. Alternatively, there can be separate antennas for transmitting and receiving. For uplink MIMO communication, each transponder antenna system 210 receives the various portions of the entire uplink electromagnetic free-space wireless signal S1U" (i.e., the bit stream segments) transmitted by each transmitter antenna 46A and 46BA so that a jumbled bit stream is received at each receiver antenna. Likewise, for downlink MIMO communication, each antenna 46A and 46B receives the various portions of the corresponding downlink signal S1D" (i.e., the bit stream segment) transmitted from each transmitter antenna system 210. Thus, hybrid head-end station 20 provides the downlink signal S1D simultaneously to the different hybrid transponders 30, though the downlink signal bit stream is divided up among the hybrid transponders according to the MIMO signal processing. Likewise, the client device simultaneously transmits the uplink signal bit streams to the different antenna systems 210, though the uplink signal bit stream is divided up among the client device antennas according to the MIMO signal processing.

In an example embodiment, hybrid head-end 20 is adapted to perform MIMO signal processing of the electrical downlink and uplink signal bit streams by carrying out mathematical algorithms that properly divide a given downlink bit stream signal into the separate downlink bit stream signals for each transponder antenna system 210 to achieve MIMO gain. Likewise, hybrid head-end 20 is adapted to properly recombine the otherwise jumbled uplink signal bit streams received by each antenna system 210. Client device 45A also preferably has MIMO signal processing capabilities so that it can communicate with antenna systems 210 using MIMO techniques.

An example MIMO signal processing approach suitable for use in the present invention is discussed, for example, in the article by Arogyaswami et al., entitled "An overview of MIMO communications—a key to gigabit wireless," Proceedings of the IEEE, Vol. 92, No. 2, February 2004, which article is incorporated by reference herein. In an example embodiment, wireless-signal converter 120 includes a MIMO chip 124 adapted to perform the aforementioned MIMO signal processing. An example MIMO chip suitable for use in head-end unit 20 to provide MIMO capability is a 802.11n-compatible MIMO chip, such as is available from Broadcom, Inc., Irvine, Calif., as part number BCM2055.

By using the MIMO communication method, independent downlink and uplink signals (bit streams) are transmitted from two or more transponder antenna systems 210, which leads to an improvement of the bit rate of up to N times, where N is the smaller of either the number of transponder antenna systems 210 used or client antennas 45 used. The MIMO method allows picocellular wireless systems employing single-antenna transponders to satisfy the higher data transmission rates anticipated by future wireless communication standards, such as IEEE wireless communication standards (e.g., IEEE 802.11n).

Figure 9:
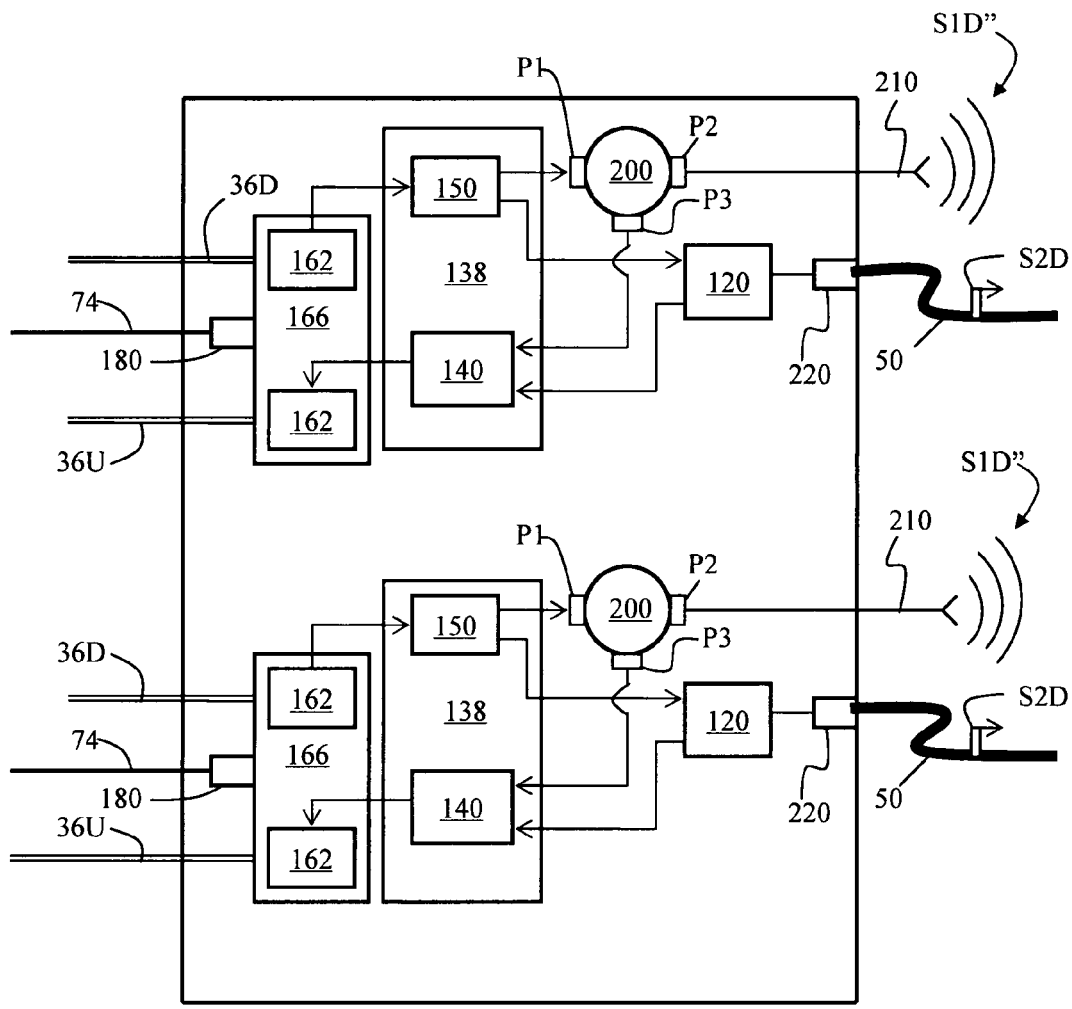
FIG. 9 is a detailed schematic diagram of an example embodiment of a MIMO hybrid transponder.
Figure 10:
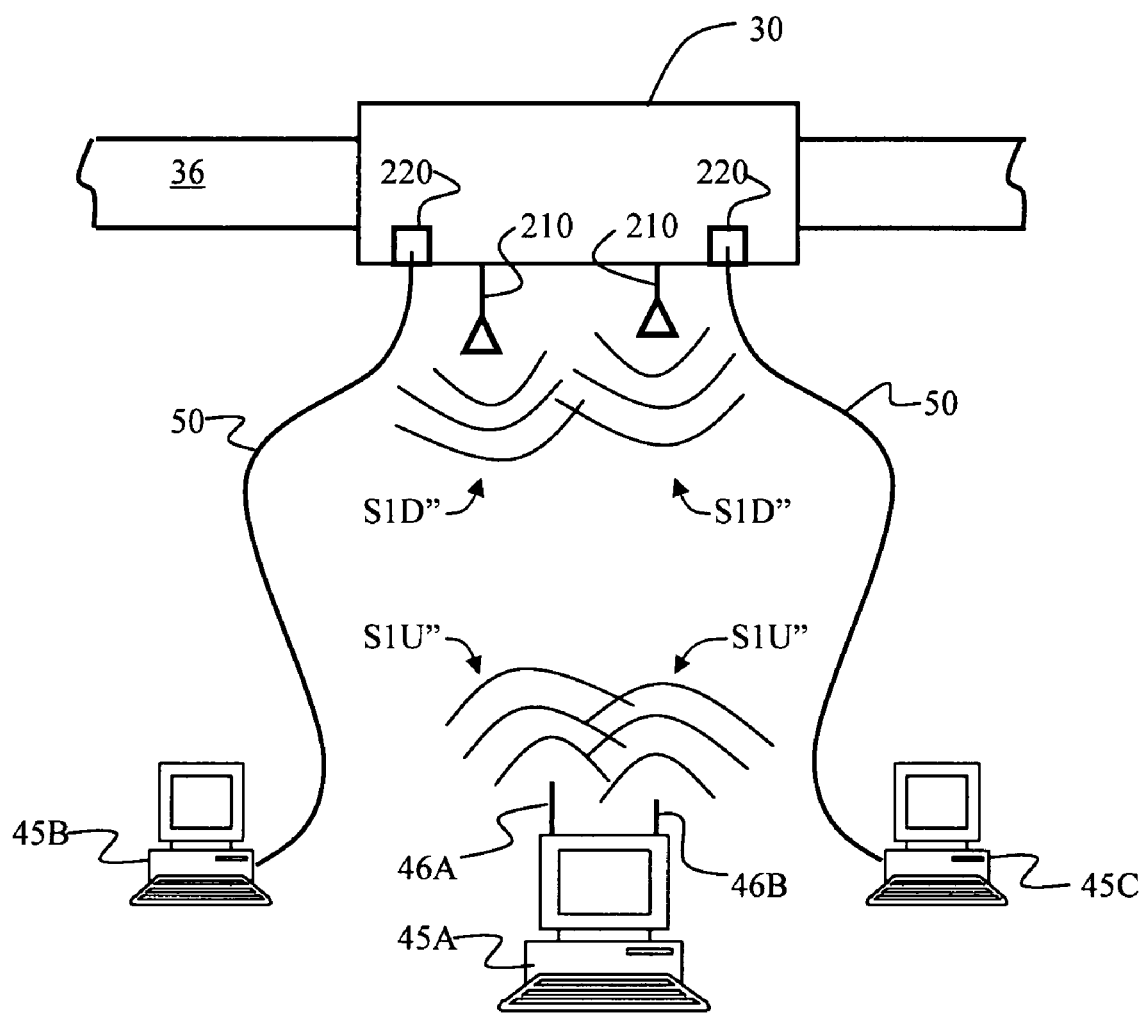
FIG. 10 is a schematic diagram of the transponder end of the hybrid RoF system of the present invention that includes the MIMO hybrid transponder of FIG. 9, illustrating the hybrid transponder providing MIMO wireless communication with one of the client devices as well as wired communication with the other two client devices.

FIG. 9 is a schematic diagram of an example embodiment of hybrid transponder 30 according to the present invention that is configured to provide 2×N MIMO capability. Transponder 30 includes two antenna systems 210. FIG. 10 is a schematic diagram of the hybrid transponder 30 of FIG. 9 as used to perform MIMO wireless communication with client device 45A as well as wired communication with neighboring client devices 45B and 45C. The MIMO wireless communication includes downlink free-space electromagnetic signals S1D" and their counterpart uplink free-space electromagnetic signals S1U". These signals are processed in the manner described above.

In FIG. 10, in an example embodiment optical fiber cable 36 includes two sets of downlink and uplink optical fibers 36D and 36U to handle two different wireless signals (e.g., wireless signals having different frequencies). In an alternative example embodiment, hybrid transponder 30 of FIG. 9 and hybrid head-end 20 (FIG. 3) are configured to frequency multiplex the different-frequency downlink and uplink wireless signals onto the same downlink and uplink optical fibers.

Data and Power-Reach Extension

Figure 11:
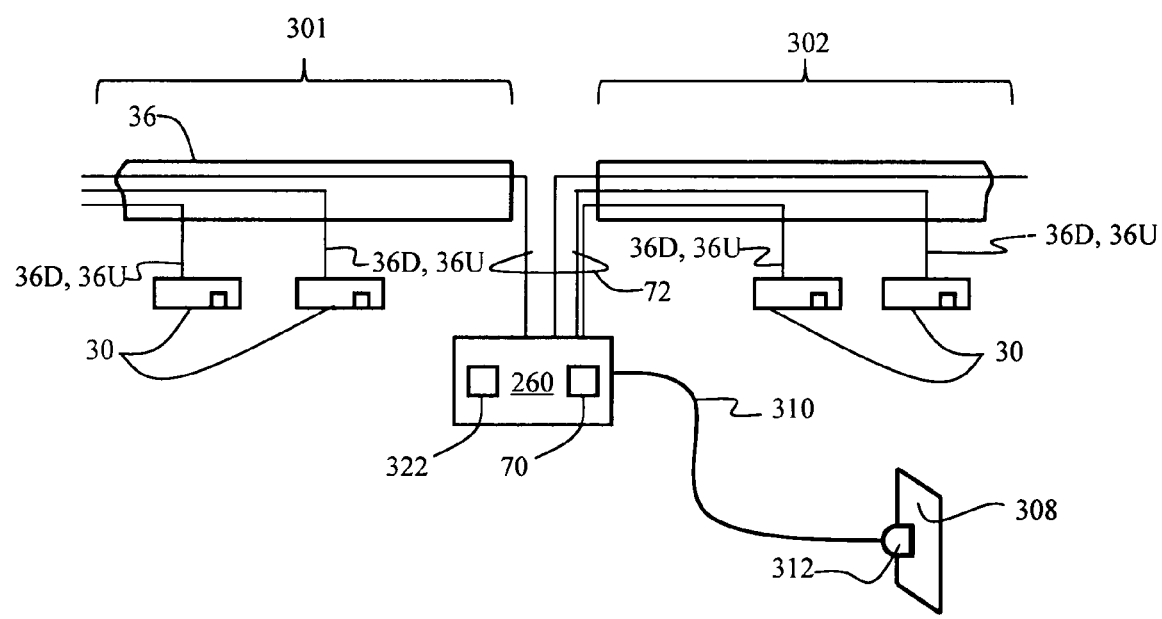
FIG. 11 is a schematic diagram of the transponder end of the hybrid RoF system of the present invention illustrating an example embodiment wherein some of the upstream hybrid transponders are connected to a remote power/data extender unit.

An example of hybrid RoF system 10 extends the maximum power and data reach of a traditional cellular (e.g., picocellular) network by allowing a connection to a powered wall socket and converting wired signals to wireless signals for the next section of traditional "picocell" cable. FIG. 11 is a schematic diagram of the transponder end of RoF network system 10 illustrating an example embodiment wherein electrical power is provided locally rather than entirely from head end 20 via electrical power line 74 carried by optical fiber cable 36 (FIG. 1), and wherein wired signals (e.g, Ethernet wireline signals) are converted to wireless signals upstream of hybrid head end 20.

The example embodiment of hybrid RoF system 10 of FIG. 11 includes a power/data extender unit 260 that includes a power supply 70 that provides electrical power via electrical power signal carried by a (multi-wire) local electrical power line 72. Local electrical power line 72 carries electrical power to hybrid transponders 30 on an upper cable span 302, which is farthest from hybrid head-end 20, while the hybrid transponders on a lower cable span 301 closer to hybrid head-end 20 are powered by power line 74 carried by link 36. In an example embodiment of power extension, power supply 70 is powered by (or is itself) an electrical outlet 308 via an electrical cord 310 and plug 312.

In an example embodiment of data extension, power/data extender unit 260 includes a wired-to-wireless converter unit (e.g., a WLAN router) 322 adapted to convert downlink wired signals S2D (e.g., Ethernet-coded wireline signals) carried on lower cable span 301 into multiple downlink wireless signals S1D in upper cable span 302. Likewise, power/data extender unit 260 is adapted to convert uplink wireless signals S1U carried on upper cable span 302 to uplink wired signals S2U that travel back to hybrid head-end 20 via lower cable span 301.

Drop-Down Configurations

An advantage of the hybrid RoF system 10 of the present invention is that it can be installed in the same manner as a wireless picocellular system is installed, with transponders hanging down to desktop height at a corner of a room for easy access to the wireline Ethernet connection. In such an office environment, a user has broadband wireless connectivity anywhere in the office, along with a wired "worry free" fast wireline Ethernet connectivity—all from a single hybrid transponder.

Figure 12A:
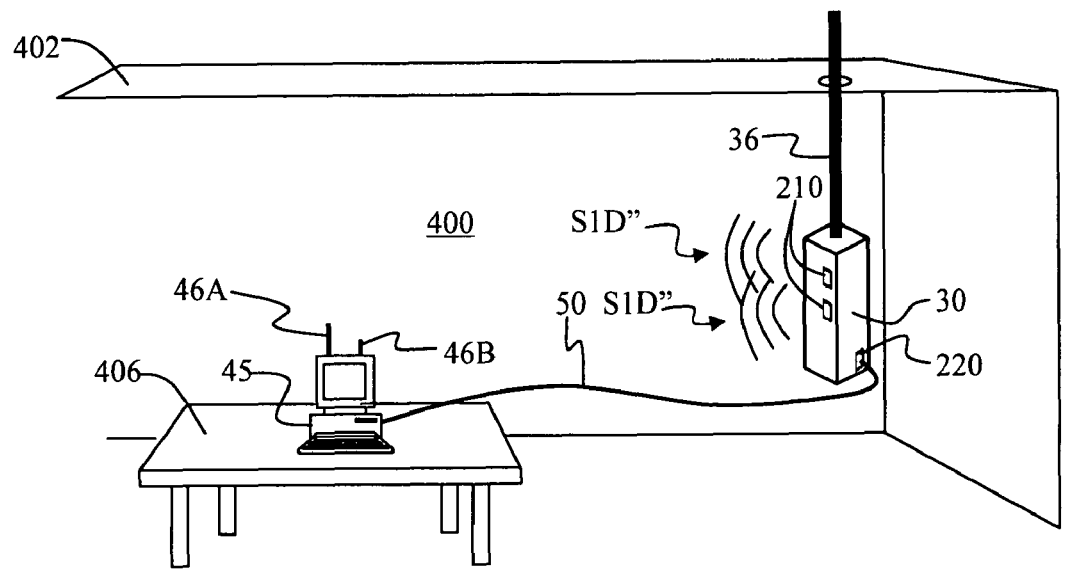
FIG. 12A is a schematic diagram of the transponder-end of the hybrid RoF system of the present invention, illustrating an example embodiment of a drop-down configuration wherein the hybrid transponder drops down from the ceiling into a room from an optical fiber cable installed above the ceiling.

FIG. 12A is a schematic diagram of the transponder end of hybrid RoF system 10 wherein hybrid transponder 30 drops down via optical fiber cable 36 into a room 400 (e.g., an office, library space, etc.) from above a ceiling 402. A client device 45 is shown resting upon a table 406 in room 400. This drop-down configuration allows for wireless communication with client device 45 as well as for convenient wired communication via wireline cable 50. The MIMO antenna system 210 shown in FIG. 12A includes patch antennas for the sake of illustration. The drop-down configuration of FIG. 12A allows for a system user to easily plug wireline cable 50 into client device 45 as well as into port 220 of transponder 30 to obtain a wired connection.

Figure 12B:
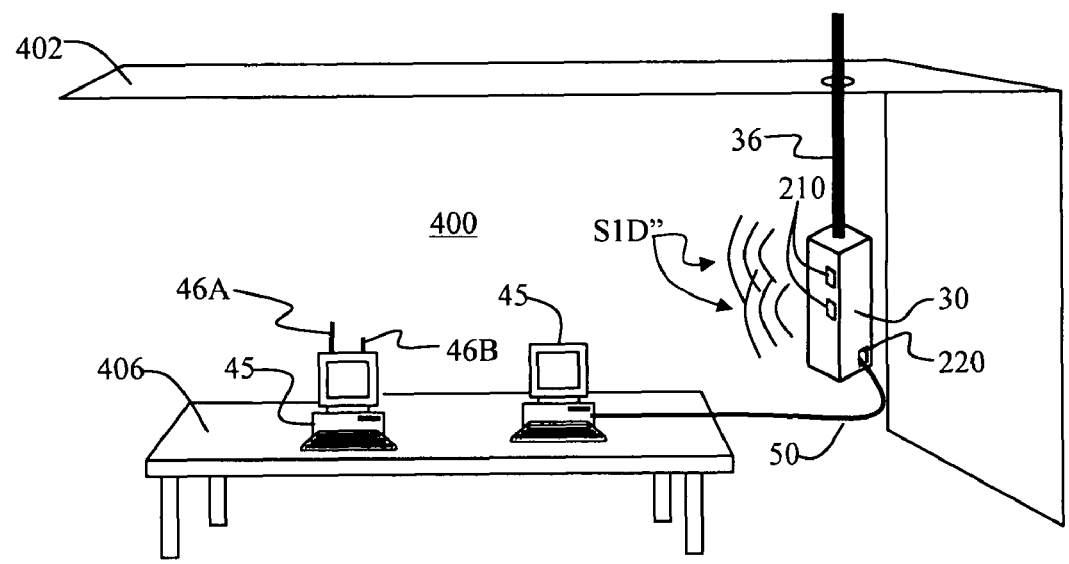
FIG. 12B is similar to FIG. 12A, and illustrates an example embodiment wherein one client device wirelessly communicates through the hybrid transponder while another client device wire-communicates through the hybrid transponder.

FIG. 12B is similar to FIG. 12A, and illustrates an example embodiment wherein one client device 45 wirelessly communicates through hybrid transponder 30 while another client device 45 wire-communicates through the hybrid transponder via wireline cable 50.

Figure 13:
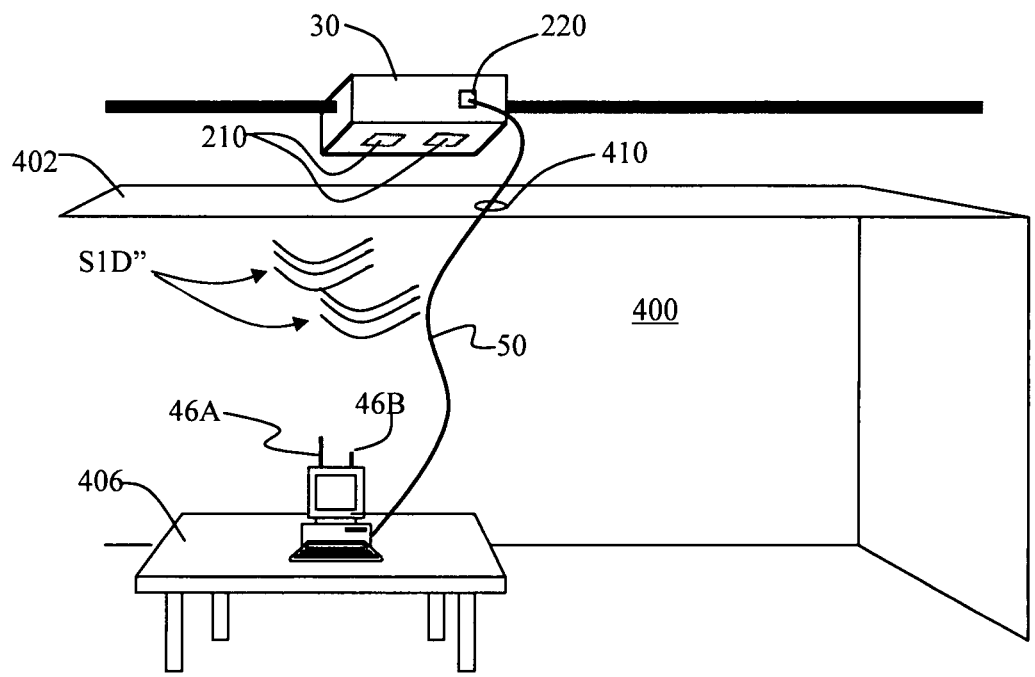
FIG. 13 is a schematic diagram similar to FIG. 12, illustrating an example embodiment of a drop down configuration wherein the hybrid transponder remains above the ceiling and wherein the wireline cable can plug into the transponder's wireline cable port and also plug into the client device to establish wired and/or wireless communication between the head-end and the client device.

FIG. 13 is a schematic diagram similar to FIG. 12, illustrating an example embodiment wherein hybrid transponder 30 remains above ceiling 402 and wireline cable 50 plugs into wireline cable port 220. Wireline cable 50 drops down through ceiling 402 (e.g., through a hole 410 formed therein) so that it can be plugged into client device 45. This configuration hides transponder 30 and is convenient so long as access to the transponder is available, or if wireline cable 50 is plugged into the hybrid transponder and dropped down from the ceiling so that the user need not have to plug wireline cable 50 into the hybrid transponder.

Figure 14A:
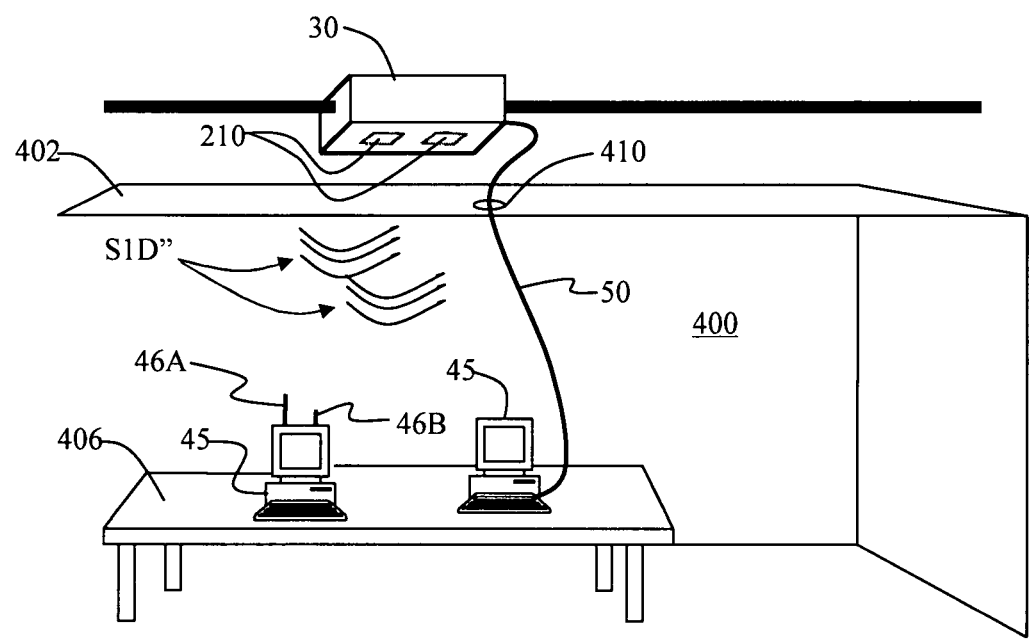
FIG. 14A is similar to FIG. 13 but shows two client devices, and illustrates an example embodiment wherein the wireline cable is connected directly to the transponder rather than to a wireline cable port in the hybrid transponder.
Figure 15:
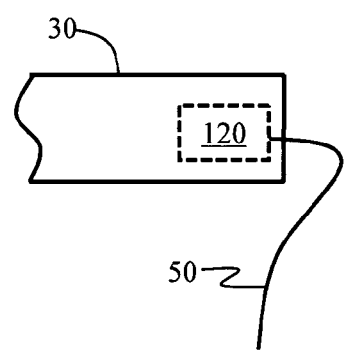
FIG. 15 is a close-up view of the hybrid transponder and wireline cable, showing the wireline cable connected directly to the transponder at the amplifier/filter electronics unit ("A/F electronics").

FIG. 14A is a schematic diagram similar to FIG. 13, except that wireline cable port 220 is not provided. Rather, wireline cable 50 is connected directly to hybrid transponder 30, e.g., at amplifier/filter unit 122, as illustrated in the close-up partial view of the hybrid transponder shown in FIG. 15. FIG. 14A also illustrates an example embodiment wherein one client device 45 wirelessly communicates through hybrid transponder 30 while another client device 45 wire-communicates through the hybrid transponder.

Figure 14B:
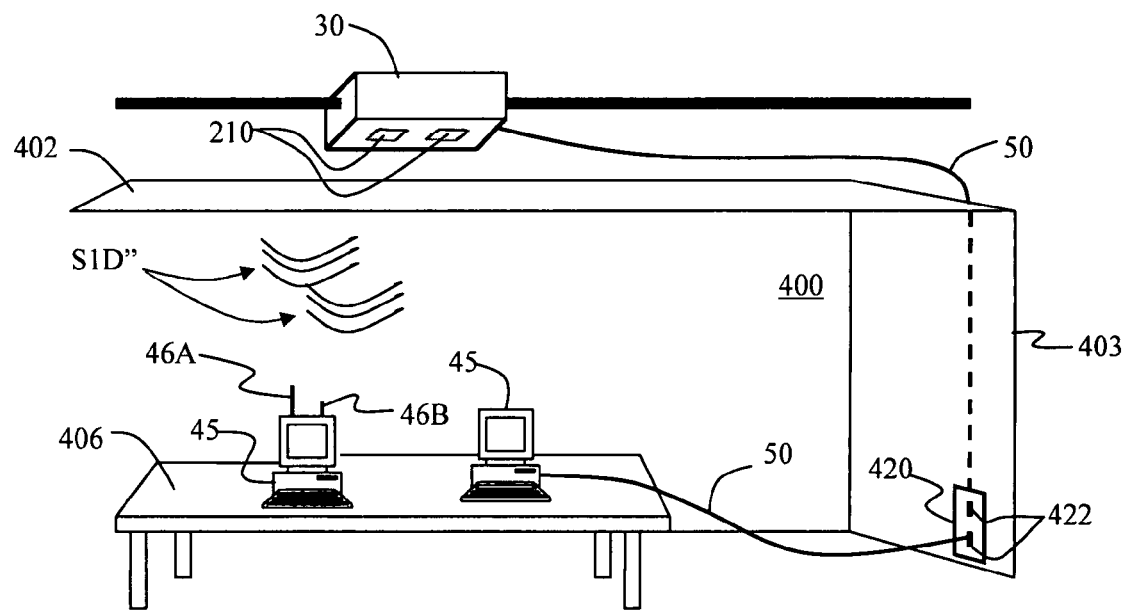
FIG. 14B is similar to FIG. 14A and illustrates an example embodiment wherein a first wireline cable connects the transponder to a wall outlet, and a second wireline cable connects the client device to the wall outlet.

FIG. 14B is a schematic diagram similar to FIG. 14A, illustrating an example embodiment wherein a first wireline cable 50 connects transponder 30 to a wall outlet 420 in wall 403, and a second wireline cable 50 connects one of the client devices 45 to the wall outlet. In an example embodiment, wall outlet 420 includes two or more sockets (e.g., RJ-type sockets) 422 so that a number of client devices can be wire-connected to transponder 30.

Advantages

Hybrid transponder 30 and the hybrid RoF system 10 that includes at least one of the hybrid transponders offer a number of advantages over transponders and RoF communication systems that separately provide wireless and wired connectivity. For example, hybrid RoF system 10 eliminates the need for separate wired and wireless network infrastructure and instead provides wireless and wired connectivity in a single integrated architecture. In addition, any new network deployment can be carried out with one fiber cable network. Further, the hybrid nature of the system has lower installation costs relative to having separate wired and wireless infrastructure deployments. Also, the hybrid RoF system of the present invention facilitates the migration from wired to wireless connections on a user-by-user basis without having to overlay new cabling.

Hybrid RoF system 10 also provides improved connection reliability achieved through the guaranteed wireline connection provided at desired locations. Hybrid RoF system 10 also extends the maximum data reach of a traditional cellular network through the use of the additional wireline data being converted to a wireless data stream for the next section of traditional RoF cable. Hybrid RoF system 10 also extends the maximum power reach of the traditional cellular network through local powering of the drop down Wireline Ethernet cable.

Both the wired and wireless features of the present invention can be easily upgraded as technology progresses. For example, MIMO capability can be updated as needed, such as from 1×2 MIMO to 2×3 MIMO or to 4×6 MIMO, etc., using cell bonding, as described in U.S. patent application Ser. No. 11/357,640 filed Feb. 17, 2006, which is incorporated by reference herein.

Hybrid RoF system 10 is also relatively easy to deploy into an existing building infrastructure. For example, it can be deployed in the same manner as optical fiber cables are deployed atop ceiling tiles rather than, for example, within building walls.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A hybrid transponder for distributing wireless and wired signals from a hybrid head-end unit to at least one client device, comprising:
   a hybrid converter adapted to convert wireless and wired optical signals from the hybrid head-end unit to wired and wireless electrical signals and vice versa;
   a frequency multiplexer/demultiplexer (M/D) electrically connected to the hybrid converter and adapted to multiplex and demultiplex the wired and wireless electrical signals;
   an antenna system electrically connected to the frequency M/D via a signal-directing element configured to allow the antenna system to transmit and receive wireless signals from the at least one client device; and
   a wireline cable port electrically connected to the frequency M/D and adapted to connect to a wireline cable to carry wired electrical signals to and from the at least one client device.

2. The hybrid transponder of claim 1, further including an amplifier/filter (A/F) electronics unit arranged between the wireline cable port and the frequency M/D.

3. The hybrid transponder of claim 1, wherein the hybrid transponder includes the wireline cable connected to the wireline cable port.

4. The hybrid transponder of claim 1, wherein the antenna system is adapted for communicating with the at least one client device using multiple-input/multiple-output (MIMO) communication.

5. The hybrid transponder of claim 1, wherein the antenna system includes at least one patch antenna.

6. A hybrid Radio-over-Fiber (RoF) communication system, comprising:
   at least one hybrid transponder according to claim 1; and
   an optical fiber cable optically coupled to the at least one hybrid transponder and that is adapted to carry the wireless and wired optical signals.

7. The hybrid RoF communication system of claim 6, wherein the optical fiber cable includes downlink and uplink optical fibers.

8. The hybrid RoF communication system of claim 6, further including the hybrid head-end unit optically coupled to the optical fiber cable.

9. The hybrid RoF communication system of claim 6, wherein the antenna system is adapted to communicate with the at least one client device using multiple-input/multiple-output (MIMO) communication.

10. The hybrid RoF communication system of claim 6, wherein one of the at least one client device is wire-connected to the at least one hybrid transponder via an Ethernet cable connected to the wireline cable port.

11. The hybrid RoF communication system of claim 6, wherein the at least one client device resides in a room having a ceiling, and wherein the at least one hybrid transponder is deployed either below the ceiling or above the ceiling.

12. The hybrid RoF communication system according to claim 6, wherein the optical fiber cable includes an electrical power line adapted to carry electrical power from the hybrid head-end unit to the at least one hybrid transponder.

13. The hybrid RoF communication system according to claim 12, further including a power/data extender unit operably coupled to the optical fiber cable and adapted to provide electrical power to one or more of the at least one hybrid transponders and to convert downstream optical wired signals to upstream optical wireless signals.

14. A method of providing wired and wireless connectivity to at least one client device from a hybrid head-end unit, comprising:
   deploying at least one hybrid transponder optically coupled to the hybrid head-end unit and adapted to convert optical wired and wireless signals from the hybrid head-end unit into electrical wired and wireless signals; and
   in the at least one hybrid transponder,
      (i) directing the electrical wireless signals to a multiple-input/multiple-output (MIMO) antenna system so as to wirelessly communicate with the at least one client device; and
      (ii) directing the electrical wired signals to a wireline cable port and to the at least one client device via a wireline cable operably connecting the at least one hybrid transponder to the at least one client device.

15. The method of claim 14, wherein the wired signals include gigabit Ethernet signals.

16. The method of claim 14, including sending the optical wired and wireless signals from the hybrid head-end unit on a single optical carrier.

17. A hybrid Radio-over-Fiber (RoF) communication system capable of providing wireless and wired connectivity to at least one client device, comprising:
   a hybrid head-end unit adapted to transmit and receive wired and wireless optical signals over an optical fiber cable;
   at least one hybrid transponder optically coupled to the optical fiber cable and configured to convert wired and wireless optical signals to corresponding wired and wireless electrical signals and vice versa, the at least one hybrid transponder further configured to wirelessly transmit the wireless electrical signals to the at least one client device via an antenna system and to wire-transmit the wired electrical signals to the at least one client device via a wireline cable that operably connects the at least one hybrid transponder to the at least one client device.

18. The hybrid RoF communication system of claim 17, wherein the antenna system and the at least one client device are configured for multiple-input/multiple-output (MIMO) communication within a picocell coverage area formed by the at least one hybrid transponder.

19. The hybrid RoF communication system of claim 17, wherein the optical fiber cable includes:
   a downlink optical fiber that carries downlink wired and wireless optical signals from the hybrid head-end unit to the at least one hybrid transponder; and
   an uplink optical fiber that carries uplink wired and wireless optical signals from the at least one hybrid transponder to the hybrid head-end unit.

20. The hybrid RoF communication system of claim 17, wherein the optical fiber cable includes an electrical power line that carries electrical power to one or more of the at least one hybrid transponder from a power supply, wherein the power supply is electrically connected to the electrical power line either via the hybrid head-end unit or directly to an optical fiber communication link.

* * * * *